(12) United States Patent
Takashima

(10) Patent No.: US 8,250,470 B2
(45) Date of Patent: Aug. 21, 2012

(54) INFORMATION PROCESSING APPARATUS, CONTROL METHOD THEREFOR, AND PROGRAM

(75) Inventor: Keiichi Takashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1389 days.

(21) Appl. No.: 11/195,653

(22) Filed: Aug. 3, 2005

(65) Prior Publication Data

US 2006/0031762 A1    Feb. 9, 2006

(30) Foreign Application Priority Data

Aug. 6, 2004    (JP) .................................. 2004-231430

(51) Int. Cl.
G06F 3/00    (2006.01)
(52) U.S. Cl. ................. 715/253; 715/243; 715/244
(58) Field of Classification Search .................. 715/200, 715/243, 244, 246, 248, 250, 253
See application file for complete search history.

(56) References Cited

U.S. PATENT DOCUMENTS

| | | | |
|---|---|---|---|
| 5,845,303 A | 12/1998 | Templeman | |
| 7,010,176 B2* | 3/2006 | Kusunoki | 382/299 |
| 7,315,983 B2* | 1/2008 | Evans et al. | 715/713 |
| 7,458,031 B2* | 11/2008 | Aamodt et al. | 715/765 |
| 7,573,486 B2* | 8/2009 | Mondry et al. | 345/619 |
| 2002/0036654 A1* | 3/2002 | Evans et al. | 345/744 |
| 2003/0167447 A1* | 9/2003 | Hatta et al. | 715/517 |
| 2004/0017575 A1* | 1/2004 | Balasubramanian et al. | 356/625 |
| 2004/0078759 A1 | 4/2004 | Ohashi et al. | |
| 2004/0189699 A1* | 9/2004 | Dobronsky | 345/751 |
| 2005/0044485 A1* | 2/2005 | Mondry et al. | 715/502 |
| 2005/0102260 A1* | 5/2005 | Spring et al. | 707/1 |
| 2005/0114784 A1* | 5/2005 | Spring et al. | 715/762 |
| 2005/0235196 A1* | 10/2005 | Iwanaga et al. | 715/500 |

FOREIGN PATENT DOCUMENTS

| | | |
|---|---|---|
| CN | 1501285 | 6/2004 |
| JP | 7-129658 | 5/1995 |
| JP | 2004-118353 | 4/2004 |

* cited by examiner

*Primary Examiner* — Stephen Hong
*Assistant Examiner* — Gregory J Vaughn
(74) *Attorney, Agent, or Firm* — Fitzpatrick Cella Harper & Scinto

(57) ABSTRACT

A template to be estimated is selected from a template list containing a plurality of types of templates for which usage conditions for layout control of content data in a page are respectively set. The usage condition of the selected template is estimated. A template used for layout control of the data in the page is decided from the template list on the basis of the estimation result. Layout control of the content data in the page is executed using the template.

9 Claims, 22 Drawing Sheets

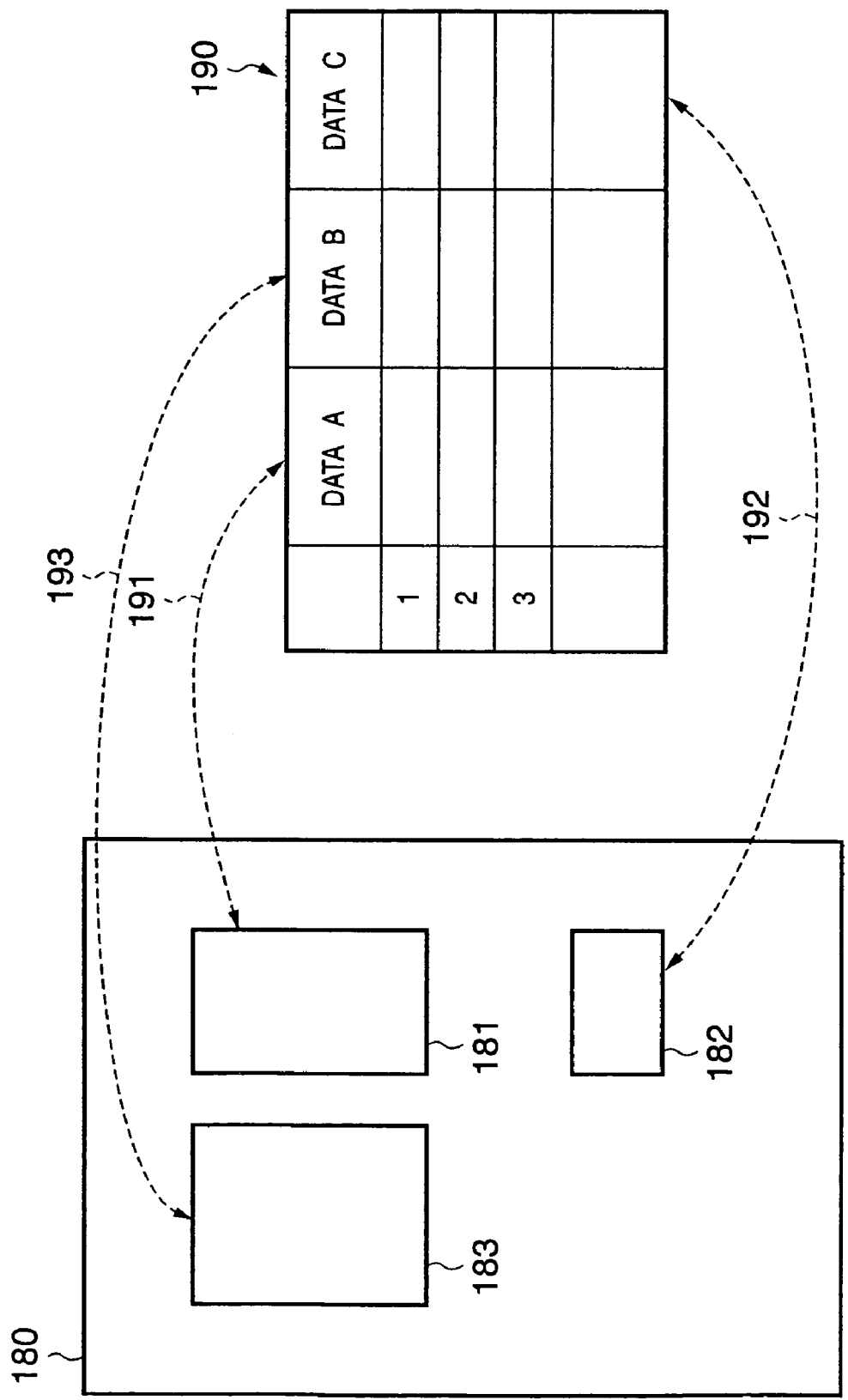

F I G. 4
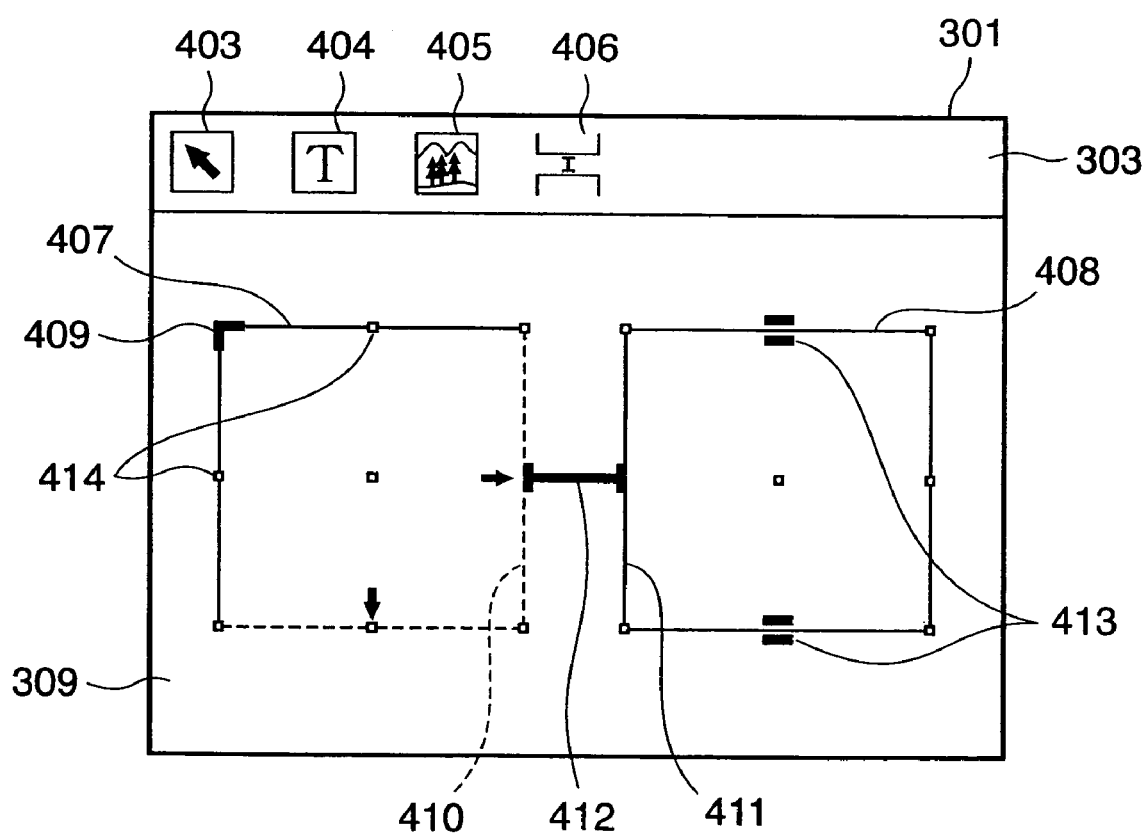

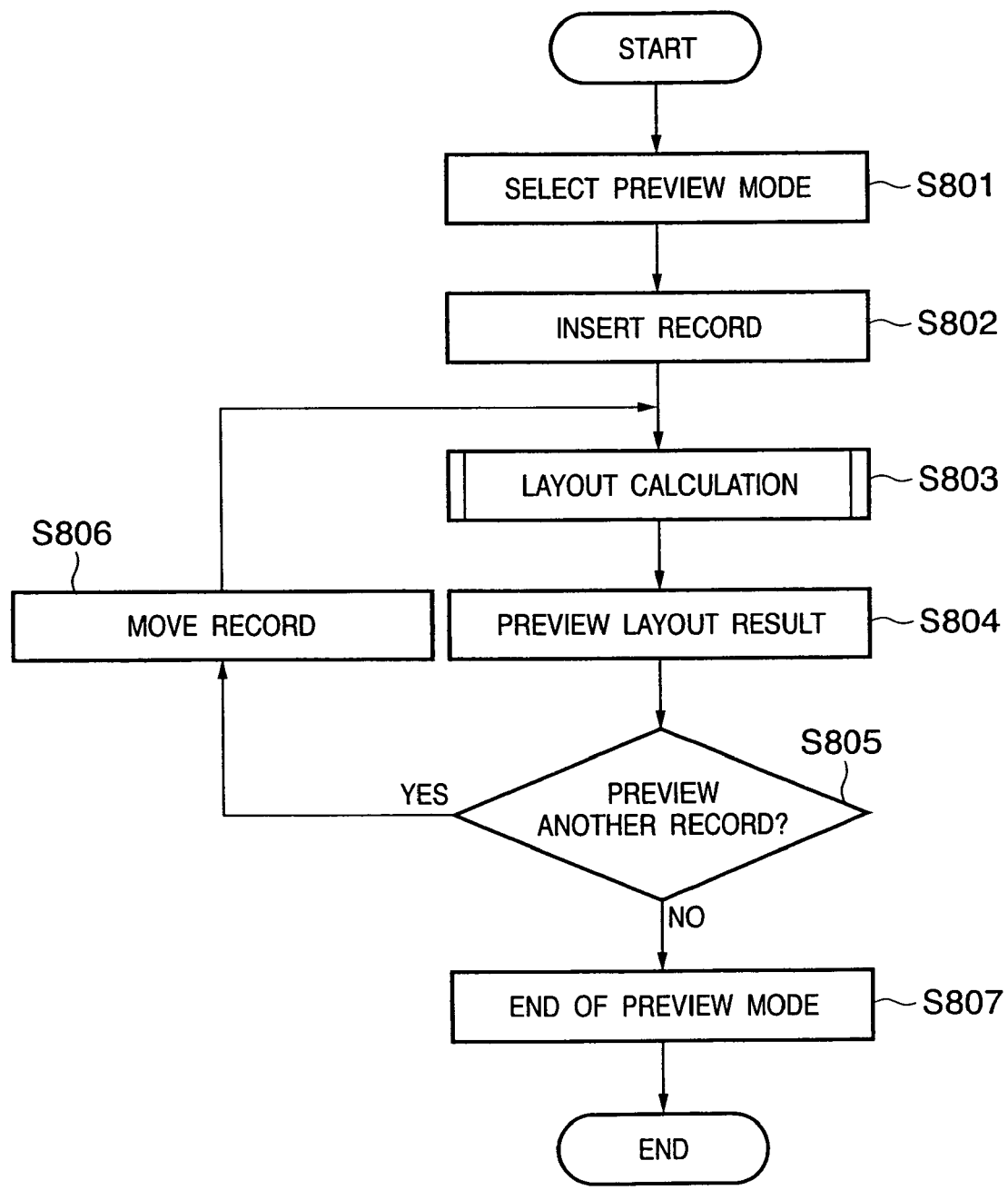

INFORMATION PROCESSING APPARATUS, CONTROL METHOD THEREFOR, AND PROGRAM

FIELD OF THE INVENTION

The present invention relates to an information processing apparatus which executes layout control of data in a page on the basis of a template that defines the layout of data in the page, a control method therefor, and a program.

BACKGROUND OF THE INVENTION

The necessity for CRM (Customer Relationship Management) and one-to-one marketing has recently received a great deal of attention due to factors such as shortening of the product life as varieties of products are produced, and customer's orientation to customized services as the use of the Internet spreads. These methods try to raise the customer satisfaction, win new customers, and keep customers.

One-to-one marketing is a kind of database marketing which creates a database of individual attribute information including the age, gender, hobby, preference, and purchase log of a customer, analyzes the contents of the database, and makes a proposal complying with customer's needs. A typical method of this marketing is variable printing. These days, a variable printing system which customizes a document for each customer and outputs the document has been developed along with the development of the DTP (Desk Top Publishing) technique and the pervasion of digital printing apparatuses. The variable printing system needs to create a customized document in which contents of a different amount for each customer are optimally laid out.

Generally, when such a customized document is to be created by the variable printing system, containers are laid out in a document. The container is a drawing area for drawing contents (drawing contents (e.g., an image and text)), and is also called a field area.

A desired customized document can be created by performing work of laying out containers in a document and associating a database with the layout (associating various contents in the database with the containers). The contents of the customized document can be changed (made variable) by properly switching contents in the containers in the customized document (changing the association). Such a document is called a variable data document, and a printing system using the variable data document is a variable printing system.

In a conventional variable printing system, the size of a container associated with a text or image serving as contents is fixed. When contents in the database are inserted (flowed) into a container and the data amount is larger than the container size, the following problems arise. That is, if the data is a text, overlapping of the text in the container occurs. If the data is an image, clipping of the image by the container occurs. When the data amount is smaller than the container size, no proper display may be obtained such that a gap appears between the container and its internal contents.

In order to solve these problems, there is proposed an automatic layout system. The automatic layout system can flexibly set the container size of a container laid out in a document. Software which implements the automatic layout system can change the container size in accordance with, e.g., the data amount to be inserted.

There is also proposed a technique of, when a text to be inserted into a container of a fixed container size cannot fall within the container size, changing (in this case, reducing) the font size of the text and displaying all the text within the container.

In an environment where the content size is flexible, when a container becomes large depending on contents to be inserted, the container overlaps another container in the same document. In an environment where the font size is flexible, the font size becomes excessively small when the data amount of text to be inserted is very large.

As another automatic layout technique for solving these problems, a technique of changing (in this case, reducing) the container size of a container adjacent to a target container when the container size of the target container increases is disclosed in Japanese Patent Laid-Open No. 7-129658 "Layout Designing Apparatus".

The variable printing system using the conventional automatic layout technique can shift the container position or change the container size, but cannot provide a completely different layout.

For example, the above-mentioned one-to-one marketing provides a brochure or catalog of different contents to each customer, and content data to be flowed greatly changes depending on the customer. If this requirement is to be satisfied by only the conventional technique, the container position may greatly shift or the container size may greatly change. That is, since only preset layouts are used, a brochure or catalog of a design greatly different from one intended by the user may be created.

SUMMARY OF THE INVENTION

The present invention has been made to overcome the conventional drawbacks, and has as its object to provide an information processing apparatus capable of switching to a layout which more properly meets a user's application purpose or intention at a higher degree of freedom, a control method therefor, and a program.

According to the present invention, the foregoing object is attained by providing, an information processing apparatus which executes layout control of content data in a page on the basis of a template that defines a layout of the content data in the page, comprising:

estimate means for selecting a template to be estimated from a template list containing a plurality of types of templates for which usage conditions are respectively set, and estimating the usage condition of the template by using the content data; and execute means for deciding from the template list a template used for layout control of the content data on the basis of an estimation result of the estimate means, and executing layout control of the content data by using the template.

In a preferred embodiment, the estimate means selects a template to be estimated from the template list in accordance with a priority set for the template, and estimates the usage condition of the template.

In a preferred embodiment, the apparatus further comprises setting means for setting a template to be registered in the template list, and the usage condition and the priority for the template.

In a preferred embodiment, the usage condition includes at least one of a first usage condition based on a layout result which is obtained by layout control using the template, and a second usage condition not based on the layout result.

In a preferred embodiment, when the usage condition of the template to be estimated includes the first usage condition, the estimate means estimates the usage condition on the basis of a layout result obtained by layout control using the template.

In a preferred embodiment, the first usage condition includes a condition based on a difference in the layout of content data in the page before and after layout control using the template.

In a preferred embodiment, a usage condition of a template of the lowest priority among the plurality of types of templates in the template list is an unconditional usage condition which does not require estimation by the estimate means.

According to the present invention, the foregoing object is attained by providing an information processing apparatus which executes layout control of content data in a page on the basis of a template that defines a layout of the content data in the page, comprising:

storage means for storing a plurality of types of templates for which usage conditions are respectively set;

deciding means for deciding, from the content data and the usage condition, a template in which the content data is to be laid out; and execute means for controlling the layout of the content data by using a size of the content data and a data area constraint which is set in the template decided by the deciding means.

In a preferred embodiment, the usage condition includes a difference in the layout of the content data before and after layout control which is executed using the template.

In a preferred embodiment, the deciding means selects a target template in accordance with priorities set for the plurality of types of templates, and decides from the usage condition of the template whether to lay out the content data, and the storage means stores, among the plurality of types of templates, a template for which no usage condition is set.

According to the present invention, the foregoing object is attained by providing a method of controlling an information processing apparatus which executes layout control of content data in a page on the basis of a template that defines a layout of the content data in the page, comprising:

an estimate step of selecting a template to be estimated from a template list containing a plurality of types of templates for which usage conditions are respectively set, and estimating the usage condition of the template by using the content data; and an execute step of deciding from the template list a template used for layout control of the content data on the basis of an estimation result of the estimate step, and executing layout control of the content data by using the template.

According to the present invention, the foregoing object is attained by providing a method of controlling an information processing apparatus which executes layout control of content data in a page on the basis of a template that defines a layout of the content data in the page, comprising:

a storage step of storing in a storage medium a plurality of types of templates for which usage conditions are respectively set;

a deciding step of deciding, from the content data and the usage condition, a template in which the content data is to be laid out; and an execute step of controlling the layout of the content data by using a size of the content data and a data area constraint which is set in the template decided in the deciding step.

According to the present invention, the foregoing object is attained by providing a program for implementing control of an information processing apparatus which executes layout control of content data in a page on the basis of a template that defines a layout of the content data in the page, comprising:

a program code for an estimate step of selecting a template to be estimated from a template list containing a plurality of types of templates for which usage conditions are respectively set, and estimating the usage condition of the template by using the content data; and a program code for an execute step of deciding from the template list a template used for layout control of the content data on the basis of an estimation result of the estimate step, and executing layout control of the content data by using the template.

According to the present invention, the foregoing object is attained by providing a program for implementing control of an information processing apparatus which executes layout control of content data in a page on the basis of a template that defines a layout of the content data in the page, comprising:

a program code for a storage step of storing in a storage medium a plurality of types of templates for which usage conditions are respectively set;

a program code for a deciding step of deciding, from the content data and the usage condition, a template in which the content data is to be laid out; and a program code for an execute step of controlling the layout of the content data by using a size of the content data and a data area constraint which is set in the template decided in the deciding step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a view for explaining an outline of variable data printing according to the first embodiment of the present invention;

FIG. 4 is a view showing an example of display of a container in the user interface according to the first embodiment of the present invention;

FIG. 8 is a flowchart showing a layout calculation process according to the first embodiment of the present invention;

DETAILED DESCRIPTION OF THE PREFERRED EMBODIMENTS

Preferred embodiments of the present invention will be described in detail in accordance with the accompanying drawings.

First Embodiment

System Configuration

The hardware configuration of an information processing system and that of a host computer as a building component of the information processing system according to the first embodiment will be described with reference to FIGS. 1A and 1B.

Figure 1A:
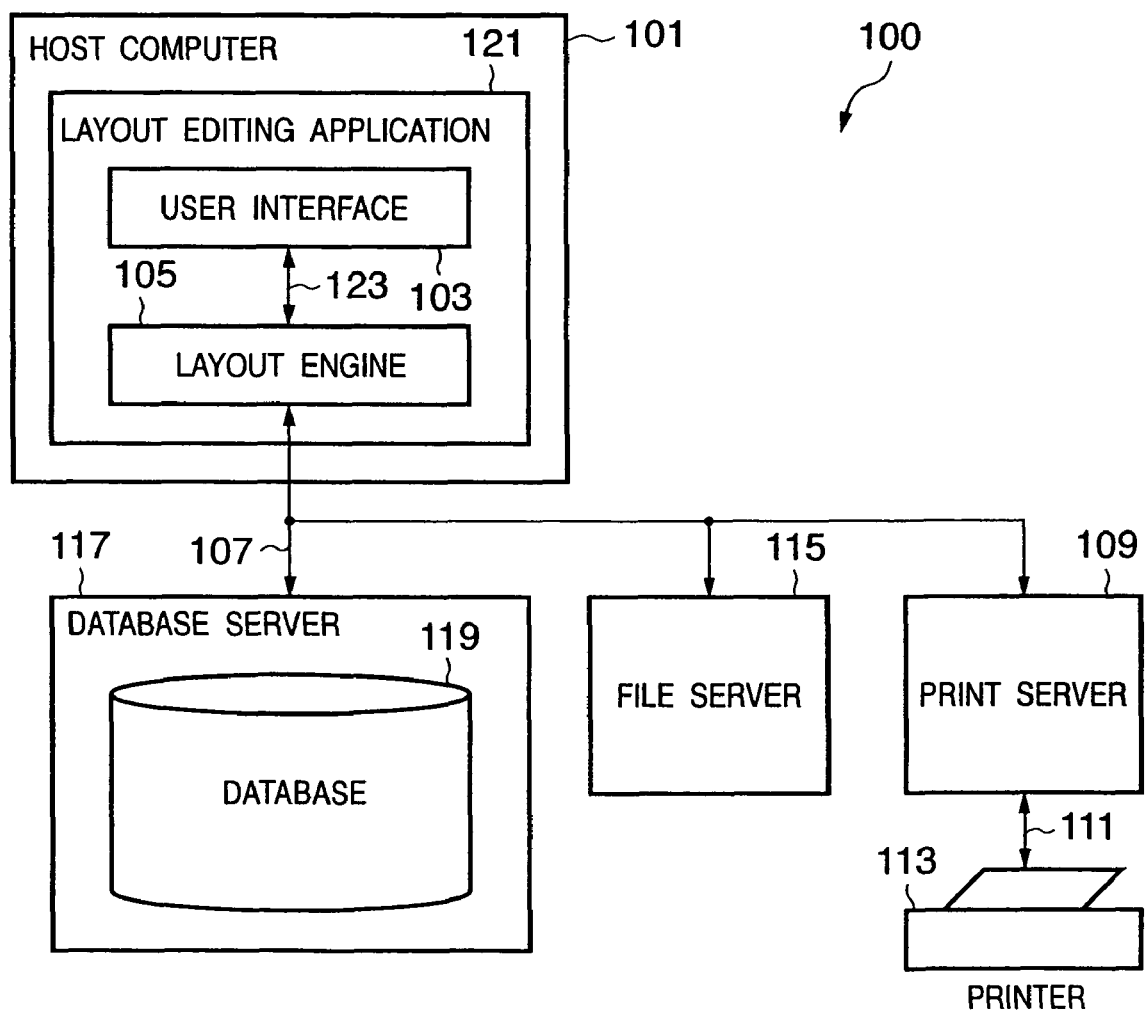
FIG. 1A is a block diagram showing an example of the configuration of an information processing system according to the first embodiment of the present invention.

FIG. 1A is a block diagram showing an example of the configuration of the information processing system according to the first embodiment of the present invention. FIG. 1B is a block diagram showing the hardware configuration of the host computer as a building component of the information processing system according to the first embodiment of the present invention.

Figure 1B:
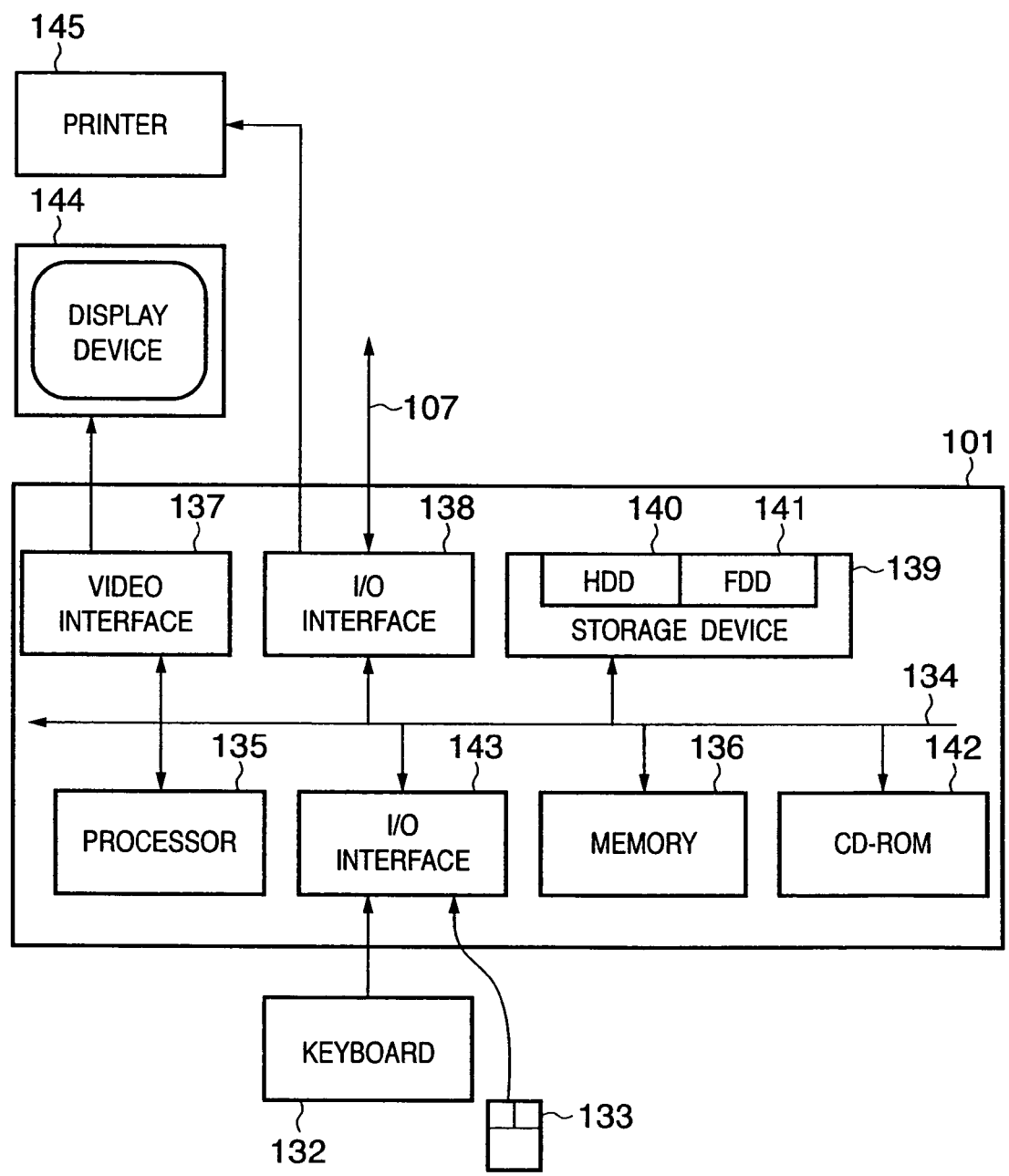
FIG. 1B is a block diagram showing the hardware configuration of a host computer as a building component of the information processing system according to the first embodiment of the present invention.

Various computers (e.g., a database server 117, file server 115, and print server 109) other than the host computer in FIG. 1A also have the same hardware configuration as, e.g., that in FIG. 1B.

In FIG. 1A, an information processing system 100 is built by connecting a host computer 101, the database server 117, the file server 115, and the print server 109 via a network 107.

The database server 117 comprises a database 119. The print server 109 is connected to a printer 113, and can properly output print data received via the network 107 to the printer 113 and cause the printer 113 to print the print data.

The information processing system 100 in FIG. 1A especially shows an example of the configuration of a variable printing system which prints a variable data document. A variable printing process to be described in the first embodiment is implemented by the host computer 101 (formed from a general-purpose computer module) which functions as a layout editing apparatus.

A layout editing application 121 which can run in the variable printing system 100 is executed completely or partially by the host computer 101. In particular, a process associated with layout editing and a process associated with printing of a variable data document are implemented by software which is executed by the host computer 101.

Software and computer programs such as the layout editing application 121 are stored in a computer-readable medium. The software and computer programs are loaded from the computer-readable medium into a memory 136 of the host computer 101, and executed. The computer-readable medium which stores software and computer programs is a computer program product. When the computer program product is used in, e.g., the host computer 101, an apparatus suitable for layout editing and variable printing of a variable data document is provided.

As shown in FIG. 1B, a keyboard 132 and a mouse 133 serving as a pointing device are connected as input devices to the host computer 101 via an I/O (Input/Output) interface 143. A display device 144 is also connected as an output device via a video interface 137. A printer 145 can also be connected via an I/O interface 138.

The I/O interface 138 also has a function of connecting the host computer 101 to the network 107. With the I/O interface 138, the host computer 101 can be connected via the network 107 to another computer apparatus (external device) in the variable printing system 100. Typical examples of the network 107 are a local area network (LAN) and wide area network (WAN).

As shown in FIG. 1B, the host computer 101 includes at least one processor 135, and a memory 136 which is formed from a semiconductor memory such as a random access memory (RAM) or read only memory (ROM). A storage device 139 includes a hard disk drive (HDD) 140 capable of exchanging data with a computer-readable medium which stores various data such as a program, and a Floppy® disk drive (FDD) 141.

Although not shown in FIG. 1B, various storage devices such as a magnetic tape drive and memory card can also be used as the storage device 139. A CD-ROM drive 142 is provided as a nonvolatile data source (a computer program may also be provided by a CD-ROM).

The host computer 101 communicates with the building components 135 to 143 of the host computer 101 via an interconnection bus 134. This communication is realized by an operating system such as GNU/LINUX or Microsoft Windows®, or a method in a conventional operation mode of a computer system which typically complies with an operating system or is formed by a well-known related technique. That is, the building components 135 to 143 are connected via the interconnection bus 134 so that they can communicate with each other, and are used by an operating system installed in the host computer 101.

Conceivable examples of the host computer 101 shown in FIG. 1B are an IBM-compatible PC (Personal Computer), Sparcstation available from Sun, and a computer system including them.

<Outline of Layout Editing Application>

In the first embodiment, the layout editing application 121 is resident in the hard disk drive 140, and controls execution and loading by the processor 135. Data fetched from the intermediary storage device of the layout editing application 121 and the network 107 use the memory 136 in response to the hard disk drive 140.

For example, an encoded program of the layout editing application 121 is stored in a CD-ROM or Floppy® disk. This program is loaded into the host computer 101 via the corresponding CD-ROM drive 142 or Floppy® disk drive 141, and installed in the hard disk drive 140.

As another example, the layout editing application 121 may be loaded from the network 107 into the host computer 101, and installed in the hard disk drive 140.

Various software programs including the layout editing application 121 may be loaded into the host computer 101 from a magnetic tape, a ROM, an integrated circuit, a magneto-optical disk, radio communication (e.g., infrared communication) between the host computer 101 and another device, a computer-readable card (e.g., a PCMCIA card), or another proper computer including e-mail communication, an intranet, or the Internet having recording information on a WEB site. They are examples of the computer-readable medium, and another computer-readable medium is obviously used.

In FIG. 1A, the layout editing application 121 causes the host computer 101 to implement variable printing (to be also referred to as variable data printing (VDP)), and includes two software components: a layout engine 105 and user interface 103.

The layout engine 105 is a software component for loading records one by one from variable data which are stored as records in the database 119, under constraints in size and position on a container (rectangular range) serving as a drawing area (partial area), and calculating, from the loaded variable data and the container constraints, the layout including the size and position of a container to which the loaded variable data is flowed.

In the first embodiment, the layout engine 105 also performs a process of drawing content data (variable data) as contents assigned to a container and generating an image of a variable data document. However, the present invention is not limited to this, and the layout engine 105 operates as an application which decides the size and position of each partial area (container) and outputs drawing information to a printer driver (not shown). The printer driver may perform a variable data document image drawing process and generate print data.

The user interface 103 allows the user to set the layout and attribute of a container and create a document template. The user interface 103 provides a mechanism of associating each container in the document template with a data source (variable data (contents) in the database 119). The user interface 103 and layout engine 105 communicate with each other via a communication channel 123.

An example of the data source for generating a variable data document is the typical database 119 in the database server 117 which generally executes a database application and is formed from another computer.

The host computer 101 communicates with the database server 117 via the network 107. The layout editing application 121 generates a document template to be saved in the host computer 101 or the file server 115 which is generally formed from another computer.

The layout editing application 121 generates a variable data document which is formed from a document template merged with variable data (content data) serving as contents to be flowed into a container. The variable data document is directly printed by the printer 113 via the local file system of the host computer 101, the file server 115, or the print server 109.

The print server 109 is a computer which provides a network function to the printer 113 which is not directly connected to the network 107. The print server 109 and printer 113 are connected via a typical communication channel 111 (e.g., USB, IEEE 1394, or wireless LAN).

Another example of the configuration of the variable printing system 100 will be explained with reference to FIG. 1C.

Figure 1C:
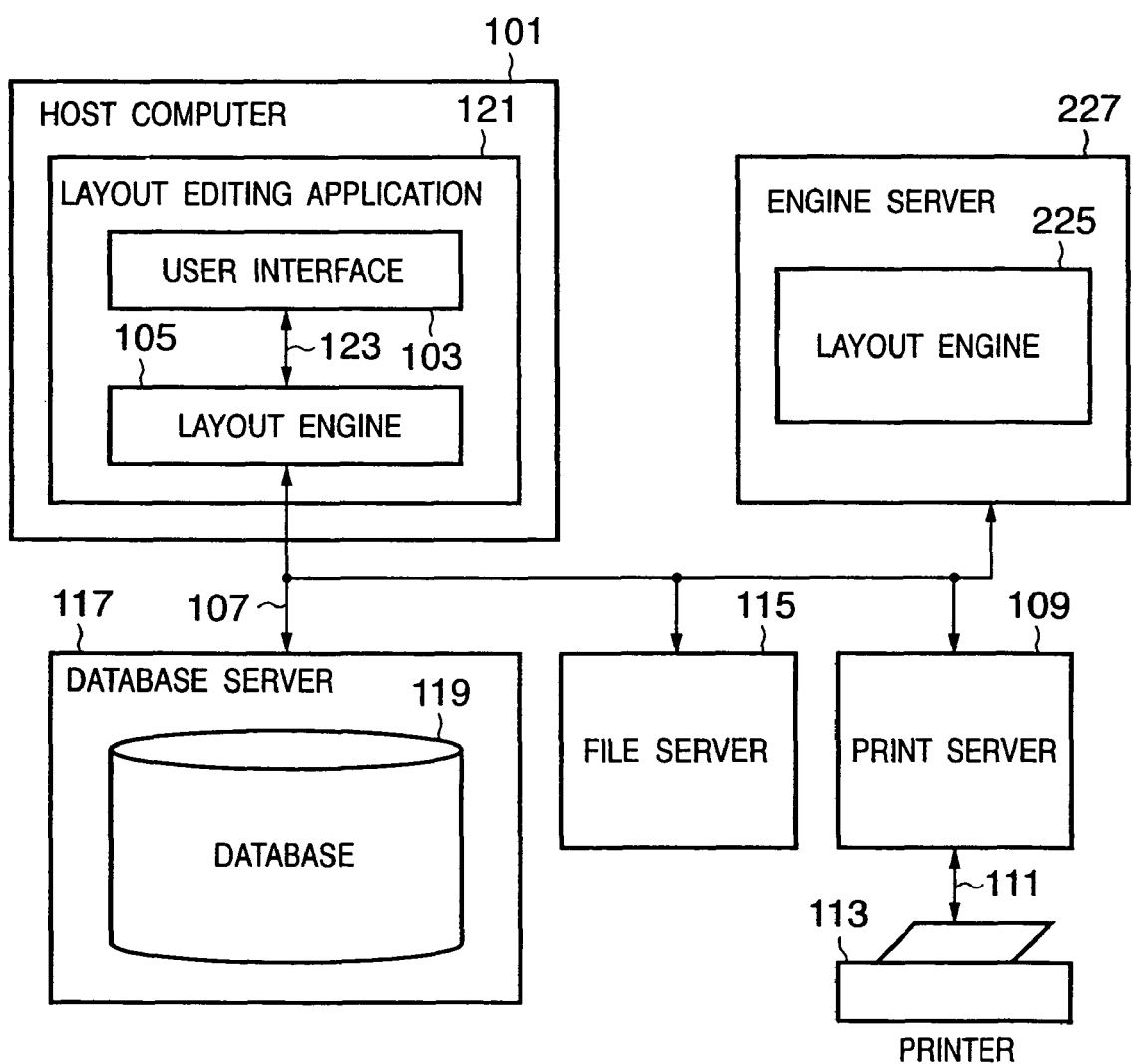
FIG. 1C is a block diagram showing another example of the configuration of the information processing system according to the first embodiment of the present invention.

FIG. 1C is a block diagram showing another configuration of the information processing system according to the first embodiment of the present invention.

FIG. 1C illustrates an example in which an engine server 227 is added to the network 107 and a layout engine 225 is installed in the engine server 227. That is, in this configuration, the layout engine 105 in the host computer 101 is implemented in the engine server 227. This configuration can reduce the process load of the host computer 101.

The engine server 227 is formed from a typical computer, similar to the remaining servers. A document template saved in the file server 115 can be combined with data saved in the database 119 in order to generate a document by the layout engine 225 for printing or another purpose. Such operation is requested via the user interface 103 or so requested as to print only a specific record.

The functional configuration of the host computer will be explained with reference to FIG. 1D.

Figure 1D:
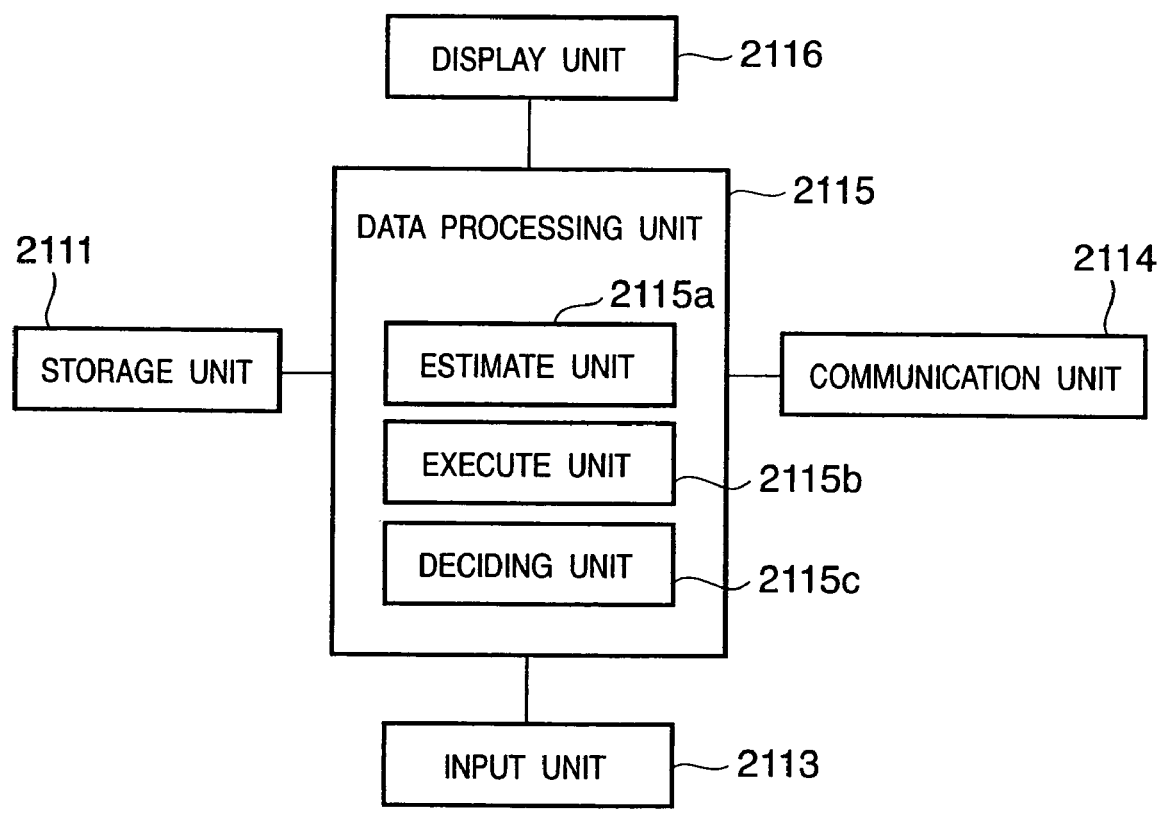
FIG. 1D is a block diagram showing the functional configuration of the host computer as a building component of the information processing system according to the first embodiment of the present invention.

FIG. 1D is a block diagram showing the functional configuration of the host computer according to the first embodiment of the present invention.

A data processing unit 2115 controls a storage unit 2111, display unit 2116, and input unit 2113, and executes various processes (e.g., processes represented by the flowcharts of FIGS. 8, 9, 14, and 17) realized by various programs such as a layout editing application 103.

The data processing unit 2115 has a function of executing layout control of content data in a page on the basis of a template which defines the layout of content data in the page. Building components which implement this function are at least an estimate unit 2115*a*, execute unit 2115*b*, and deciding unit 2115*c*.

The estimate unit 2115*a* selects a template to be estimated from a template list containing a plurality of types of templates for which usage conditions are respectively set. The estimate unit 2115*a* estimates the usage condition of the template by using content data.

The execute unit 2115b decides from the template list a template used for layout control of content data on the basis of the estimation result, and executes layout control of the content data by using the template.

As another function, the storage unit 2111 stores a plurality of types of templates for which usage conditions are respectively set. The deciding unit 2115c decides, from content data and the usage condition, a template in which the content data are to be laid out. The execute unit 2115b controls the layout of content data by using the size of content data and a data area constraint which is set in the decided template.

FIG. 1D merely illustrates a configuration corresponding to constituent features of an embodiment of the invention, and a configuration corresponding to the internal configuration of the data processing.

A communication unit 2114 is implemented by the I/O interface 138, and exchanges data via the network 107. The input unit 2113 is implemented by the keyboard 132 and mouse 133, and accepts an operation input from the user.

The display unit 2116 is implemented by the display 144, and displays the status of an operation input and image data in process. The storage unit 2111 is implemented by the storage device 139, and stores data to be processed and a database for storing records.

An outline of variable data printing will be explained with reference to FIG. 2.

FIG. 2 is a view for explaining an outline of variable data printing according to the first embodiment of the present invention.

A plurality of containers 181 to 183 are laid out on a page in accordance with an operation instruction from the user via the user interface 103 of the layout editing application 121, and constraints on position and size are assigned to the containers to generate a document template 180. The constraints also include a link (to be described later).

The user interface 103 associates the document template 180 with a data source 190 (e.g., the database 119), and further associates each container with each data field in the data source 190. Association information representing the association between each container and each data field in the data source 190 is described in the document template 180, and the document template 180 is stored in the HDD 140. The data source 190 is a file which describes item data for each record, and is stored in the HDD 140.

The layout engine 105 loads data associated by association information from the data source 190 into the containers 181 and 182 of the document template 180 in accordance with a print instruction or preview instruction from the user. The layout engine 105 flows the loaded data of each record into the containers (e.g., flows data fields A to C of data record 1 into the containers 181 to 183). The layout engine 105 adjusts (adjusts the layout) the size of each container and the like in accordance with the flowed content data.

For a preview instruction, the layout engine 105 generates a layout-adjusted document image, and previews it on the screen of the display device 144. For a print instruction, the layout engine 105 outputs, as print data to the print server 109, a document image generated using the layout engine 105 or printer driver. By sequentially processing data records 1, 2, 3, . . . , variable data printing is implemented.

<Description of Layout Editing Application>

The layout editing application 121 will be described.

An example of a user interface realized by the user interface 103 will be explained with reference to FIG. 3.

[Main Window]

Figure 3:
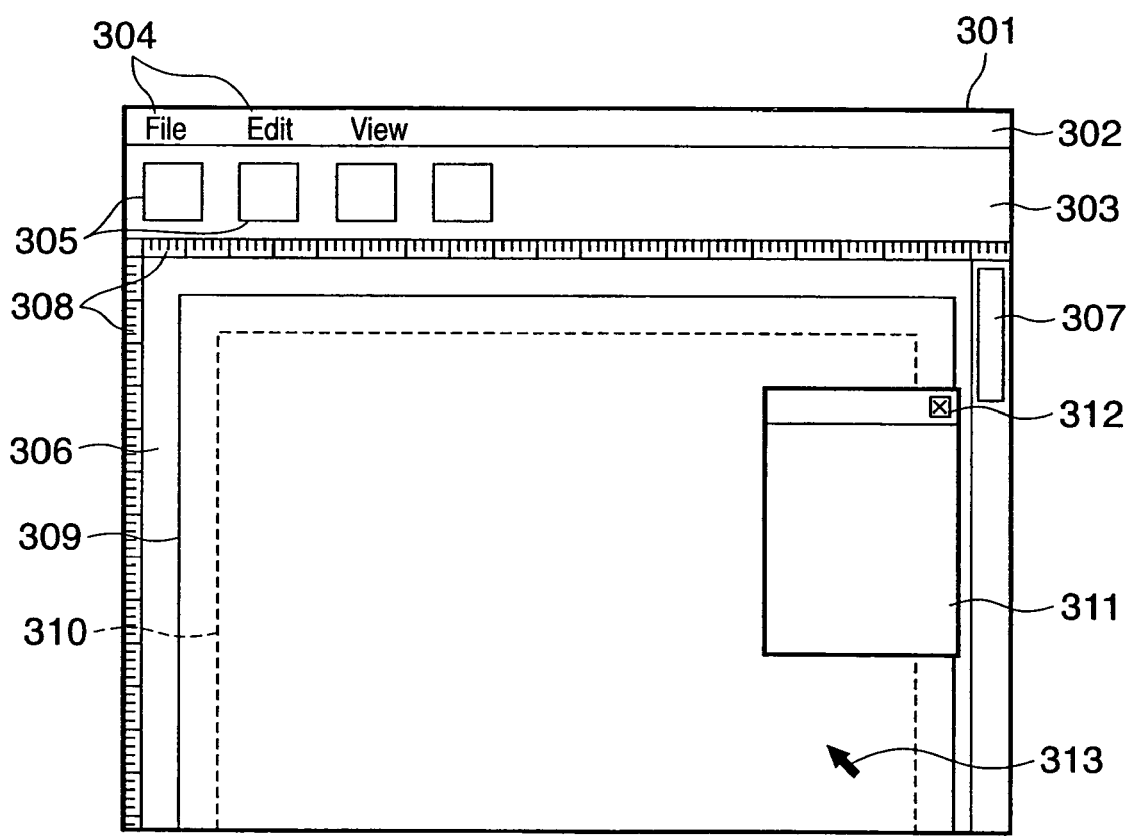
FIG. 3 is a view showing an example of a user interface according to the first embodiment of the present invention.

FIG. 3 is a view showing an example of the user interface according to the first embodiment of the present invention.

As shown in FIG. 3, the user interface 103 displays on the display device 144 a user interface which is formed by an application window 301 upon operation. The window 301 has a menu bar 302, tool bar 303, work area 306, and optional palette 311.

The menu bar 302 and tool bar 303 can be hidden or moved to various locations in the window. The location of the work area 306 can be moved by operation of the mouse 133. The palette 311 is an option, and can be controlled to be display/hidden in accordance with a purpose. A cursor/pointer 313 indicates the hotspot of the mouse 133.

As a known technique, the menu bar 302 has many menu items 304 expanded below the layer of a menu option.

The tool bar 303 has many tool buttons and widgets (components) 305 which can be hidden or displayed in a special mode of the application.

A ruler 308 is an option, and is used to indicate the position of a pointer, page, line, margin guide, container, or object in the work area 306.

A palette 311 is used to access an additional function such as a variable data library. The palette 311 has a window control button 312 for moving, resizing, and closing the palette 311. The palette 311 can be displayed on the front surface of the work area 306 or on the back surface of an object. The palette 311 can be displayed only within the application window 301, or displayed partially or entirely outside the application window 301.

The tool bar 303 has a plurality of types of "buttons" 403 to 406 which can be selected by the user, as shown in FIG. 4.

(1) Selection tool button 403: The button 403 is used to select, move, resize, and lock/unlock the edge of a container. A container is selected by dragging a selection box around the container. A plurality of containers can be selected by selecting and operating them while pressing the CTRL key of the keyboard 132.

(2) Text container tool button 404: The button 404 is used to create a container having a static or variable text.

(3) Image container tool button 405: The button 405 is used to create a container having a static or variable image.

(4) Link tool button 406: The button 406 is used to create a link for associating containers, and also used to control the distance of a link.

As a known technique, these buttons are implemented as tool tips of icons which change in accordance with an operation status.

The application window 301 can decide a basic layout by laying out containers and links in a page. The basic layout is a base for variable data printing. When each container in the basic layout is a fixed layout, the print results of all records have the same layout.

When each container in the basic layout is a flexible container (to be described later), the size and position of the container change in accordance with the amount and size of data loaded from each record under constraints (to be described later). Hence, a document template created by the layout editing application 121 decides only the basic layout. When the document template contains a flexible container, the layout of a finally printed material is adjusted in accordance with flowed content data.

[Document Template]

In FIG. 3, the work area 306 is used to display and edit the design of the document template (180: basic layout). The work area 306 can present an outline of a document to be printed to the user while the user designs a document template. From this preview, the user can easily understand how a document merged with the data source (190) changes depending on the amount and size of variable data.

When the data source is associated with the document template, corresponding variable texts and images are displayed in laid-out containers so as to preview a current document.

A document structure and visual clues (e.g., frame, anchor, slider, and link of a container) for drawing a container in the document template are always displayed in creating the document template. In preview for flowing variable data, visual clues are displayed when the cursor is moved onto a container or a container is selected.

The work area 306 includes a scroll bar 307, the optional ruler 308, and a document template 309. The document template 309 can show that a document has a plurality of pages. The document template 309 corresponds to the document template 180 in FIG. 2.

The page size of a given document template is designated by the user using a known technique. For example, a dialog for setting a page size is displayed by selecting "page setup" from "file" on the menu, and a page size designated by the user is reflected in the dialog.

The number of actual pages of each document may change depending on content data (variable data) in an associated data source. This is because an additional page is automatically created upon loading content data which cannot be fit in one page when a field that changes in size depending on the variable data amount, like a flexible table, is set in the document template.

A boundary 310 displayed in each page is an arbitrary page margin which represents the maximum width of a printable object on the page.

FIG. 4 shows an example of objects which can be displayed in the document template 309 for one page.

Such objects are containers 407 and 408, an arbitrarily applied anchor icon 409, fixed edges 411 and 414, an unfixed edge 410, a link 412, and a slider 413.

The anchor icon 409 can be set at a corner or edge of a rectangular container or at the center of a container. When the anchor icon 409 is set, the position of the set anchor icon 409 is fixed. In the example of FIG. 4, the anchor icon 409 is set at the upper left corner of the container 407. In this case, variable data is flowed into the container 407. The anchor icon 409 shows that the container can be enlarged to the right or down when the image size or text amount of variable data is large.

When the anchor icon 409 is set at an edge, the edge is fixed, and the container can be enlarged along the three remaining edges. When the anchor icon 409 is set at the center of a container, the center position of the container is fixed, and the container can be enlarged in four directions so as not to change the center position of the rectangular container. The link 412 represents that the containers 407 and 408 are associated, though details of the link 412 will be described later. The link 412 also represents that the container 408 can be moved to the right while maintaining a length (range can be specified) set for the link 412. The slider 413 shows that it can be moved parallel to an edge at which the slider 413 is set.

[Container]

A container will be explained. The container is a drawing area (to be referred to as a partial area) where a fixed or flexible text and image are flowed from a variable data file into a document template and drawn. The container is laid out together with other containers and objects, as shown in FIG. 4. The container is moved, adjusted in size, or created again by operation of the mouse 133 in accordance with an operation instruction from the user via the user interface.

More precisely, the container has a set of settings, visual representation, interaction, and editing operation. The definition of the container in the first embodiment will be described.

(1) A container has fixed or flexible contents. Content data (variable data) serving as flexible contents can be said to be dynamic in a sense that data acquired from the data source may change for each document, i.e., each record. Note that flexible contents in the first embodiment are not intended to be animated contents or contents which change over time by another method because these contents are not suitable for printing.

Similarly, fixed contents are displayed in the same way for all documents generated using containers. When, however, a link to flexible contents is set, fixed contents may change in position in each document under the influence of the flexible contents.

(2) A container has decoration functions similar to text settings such as the background color, border, and font style which are applied to contents. These settings will be called container attributes. The container attributes can be set for each container, and a container can also be given the same container attributes as those of a given container.

(3) A container is merged with data from the data source when a document is generated. The decoration function is visible on a printout for any fixed contents. Flexible contents provide display of specific data from the data source. This representation of the container can be, for example, printed and/or also displayed on the screen of the display device 144.

(4) A container has a user interface as a visual clue, as shown in FIG. 4. For example, a container has an interactive graphical user interface (GUI) for editing a container and setting its display. GUI components are displayed on the screen of the display device 144, but are not printed in a document. The user interface 103 of the layout editing application 121 displays some of the container decoration functions such as the background color and font, and has a function of enabling editing and displaying container settings.

Examples of special purposes of the user interface function are a border, or a corner icon for interactively changing and displaying the size and position of a container, an overwrite count representing container operation when a container is merged with data from the data source, a line, an icon, and a text.

[Container Constraints]

The container has constraints on controlling how to link contents displayed in each document. These constraints (including linking of fixed/flexible contents to a container) are a major method of controlling generation of many documents from one document template by the user.

An example of the constraints is "the height of contents in this container is 4 inches at maximum". Another example of the constraints is "the left edge of contents in the container must be displayed at the same horizontal position in respective documents". The descriptions of the constraints provide various methods for displaying and editing these constraints by using the GUI.

A content place holder which designates the layout of fixed contents, like an image which has a defined place on a page, is well known in the digital printing technique. A container has a position and size, which are edited and displayed by a method known in a conventional technique. The following description is focused on display and editing by a method specialized in variable data printing.

By using a container, the user can designate the size (drawing size) and position of contents in a document. Since a plurality of types of documents are generated from one document template, many possibilities and constraints are set on a container. For these settings (designation) and display, a predetermined user interface is exploited.

The edge of one container defines a virtual boundary within which associated contents are displayed in a document. Hence, a discussion about the left edge of a container is a discussion about the leftmost edge in an area in which associated contents can be displayed in each document. Similarly, a discussion about the height of a container is understood to be a discussion about constraints on the height of associated contents in a generated document. In this specification, this distinction will become apparent when the edge or size of a container is discussed by referring to the user interface 103.

In the following description, a term "fixed" which defines a given value used to constrain display of contents applies to all documents.

(1) When the width of a container is fixed, a width assigned to associated contents is equal in all documents.

(2) When the height of a container is fixed, a height assigned to associated contents is equal in all documents.

(3) When the distance (length of a link) is fixed, a designated distance acts as a constraint in all documents.

(4) When the right and left edges of a container are fixed, the horizontal positions of the edges of a page are identical in all documents. However, the height or vertical position of a container may change. For example, when the left edge of a container is fixed, the position of the left edge is identical in all documents, but the display position of associated contents may change so that they are displayed at an upper portion on a page in a given document but at a lower portion on a page in another document.

(5) When the upper and lower edges of a container are fixed, the vertical positions of the edges of a page are identical in all documents. However, the width or horizontal position of a container may change in each document.

(6) The vertical axis of a container is a virtual vertical line which is parallel to the right and left edges of the container and positioned between them. If the vertical axis of a container is fixed, the average (i.e., center position between the right and left edges) of the horizontal positions of the right and left edges of the container is identical in all documents. Under this constraint, the width of a container may change. However, the vertical axis is at the same horizontal position in all documents including a document whose right and left edges are the farthest from the vertical axis and a document whose right and left edges are the closest to the vertical axis. The height and vertical position of a container are not influenced by this constraint.

(7) Similarly, if the horizontal axis is fixed, the average of the upper and lower edges of a container coincides with the same vertical position. However, the width and horizontal position of a container are not influenced by this constraint.

(8) When both the horizontal and vertical axes are fixed, this means that the center position of a container is fixed. However, the width and height of a container are not influenced by this constraint.

(9) When the corner position of a container, the intermediate position of the edge of the container, or the center position of the container is fixed, the fixed position is identical in all documents. For example, if the upper left corner of a container is fixed, the upper left position of a laid-out container is identical in all documents.

(10) A vertical edge or axis can be fixed in association with the left or right edge of a page, a left or right page margin, or another horizontal position. Similarly, a horizontal edge or axis can be fixed in association with the upper or lower edge of a page, an upper or lower page margin, or another vertical position.

A term opposite to "fixed" is "flexible" which means that the edge, axis, corner, or intermediate position of a container, or a document constraint may change between documents (records). For example, the layout in a page is expected to dynamically change depending on the size and amount of variable data. For a specific container, its size and position may be desirably fixed or the four corners of a container at a corner of a page may be desirably fixed.

To meet these demands, the layout editing application 121 can properly set whether to fix or change (make flexible) an edge, axis, corner, intermediate position, or the like for each container (partial area). The user can create a desired basic layout when he decides the basic layout of the document template 180.

[Display and Editing of Container]
—Method of Creating New Container—

A container is described as either of two, text and image containers. The text container has a text and buried image. The image container has only an image.

As shown in FIG. 4, a new text container or image container is created on the document template 309 by clicking the text container tool 404 or image container tool 405 with the mouse 133 and dragging a rectangle onto the document template 309.

Alternatively, a container may be created by making a desired one of the text container tool 404 and image container tool 405 active and simply clicking on the document template 309. In this case, a container of a default size is inserted into the template in accordance with clicking of the mouse 133, and a dialog box or another prompt for setting the dimensions of the new container or the like is provided.

Note that the container size may be set by various methods so that the container size is automatically defined in advance or a container is created and laid out in accordance with a calculated schema. A generated container is selected with an input device such as a mouse, and operation such as designation of properties with right clicking is performed. Then, the property dialog of a container is displayed, and constraints on the container can be set.

[Container Display Method]

FIGS. 5A to 5D illustrate display rules on the edge of a container.

The layout editing application 121 draws an edge by using a solid line 503 (item) or dotted line 504 in order to represent the state of the container edge. The layout editing application 121 also uses anchors 506, 507, and 509 (lines, shapes, or icons drawn near the edge of a container), a handle 502 (control point drawn on or near the edge of an area for movement and modification), the slider 413 (short parallel lines drawn on the two sides of an edge: see FIG. 4), a scaling icon 505, and the color.

The rules of the container display method shown in FIGS. 5A to 5D are as follows.

(1) In order to fix each edge, the edge is drawn in a solid line.

(2) When the width is fixed, the right and left edges are drawn in solid lines.

(3) When the height is fixed, the upper and lower edges are drawn in solid lines.

(4) No axis is drawn.

(5) Scaling icons are drawn near edges which are not drawn by rules (1) to (3), and these edges are drawn in dotted lines.

(6) If a pair of vertical and horizontal edges or vertical and horizontal axes is fixed, an anchor is drawn at the intersection.

(7) If no anchor is drawn on any fixed edge, a slider is drawn at the center of the edge.

(8) If neither anchor nor slider is drawn on a pair of vertical and horizontal edges or vertical and horizontal axes, a handle is drawn at the intersection.

Lines defined by rules (1), (2), and (3) are drawn in solid lines because these lines are fixed or restricted, as described above. A flexible line is drawn in a dotted line, as defined by rule (5). Anchors are displayed at fixed points defined by rules (6), (7), and (8), sliders are displayed on several fixed edges, and handles are displayed for other components.

The above rules give priority to a constraint set later by the user. More specifically, when another constraint is set later and the rules influence an edge to be drawn, the drawing contents of solid and dotted lines are changed. For example, when a container is so small that icons overlap each other or another display function becomes obscure, the icons may be changed or omitted to draw lines.

The place at which a flexible edge is drawn depends on the contents of a container. As will be described later, a "dynamic calibration process" is employed which means that contents are merged into a document template and visualized on a user interface. Alternate execution can be achieved by another means for deciding where a flexible edge is laid out in a user interface or in the content area of a container averaged in all documents.

These content representations provide a graphic function of displaying the state of each edge of a container. The representations are interpreted as follows.

(1) A dotted line means that the position of an edge in a document changes depending on the contents of a container, like the edge 410 in FIG. 4.

(2) The solid edge 414 means a fixed edge or an edge restricted because the width or height of a container is fixed (the four edges of the container 408 are drawn in solid lines and both the width and height are fixed).

(3) An anchor means that a place where edges or axes cross each other is fixed. Anchor points appear at horizontal and vertical positions in all documents, and anchors are naturally fixed. The icon 409 in FIG. 4 is an example of the anchor icon meaning that the position where the edges 414 cross each other is fixed.

(4) A slider means that the length of an associated edge is fixed but may be translated. For example, the slider 413 in FIG. 4 represents that the contents of the container 408 may be displayed left or right to a position given by a specific diagram in a document.

For example, when the image size or text amount of data flowed into the container 407 associated with the container 408 (link is set between them) is small, the size of the container 407 decreases. Thus, the container 408 is slid (translated) to the left, laid out, and displayed. When the size of the container 407 increases, the container 408 is slid to the right and laid out.

Some or all of these icons and edges are drawn or are not drawn depending on which of tools and containers is selected, highlighted, or made active. Generally, the edges and icons of a container are assistance to design a document template, and are not drawn on a printed material.

As described above, settings of a basic pattern such as the default, minimum, and maximum values of the width and height of a container are displayed in a secondary dialog window.

Figure 5A:
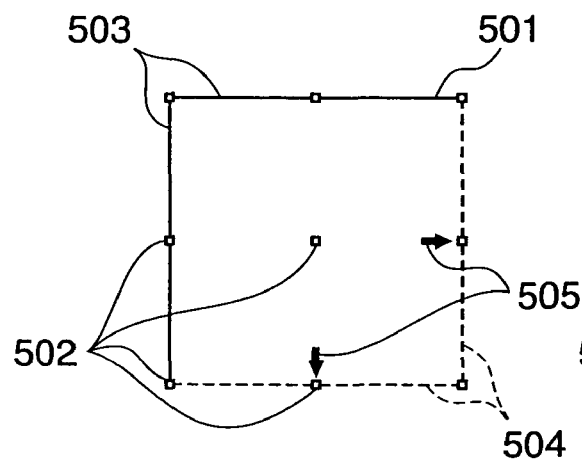
FIG. 5A is a view for explaining container display rules according to the first embodiment of the present invention.

In FIG. 5A, both the width and height of a container 501 are not fixed (are flexible). A solid edge 503 is represented in a solid line, and a flexible edge 504 is represented in a dotted line. A scaling icon 505 exhibits that the adjacent edge 504 is flexible. An indicator in another form may be used instead or additionally.

Figure 5B:
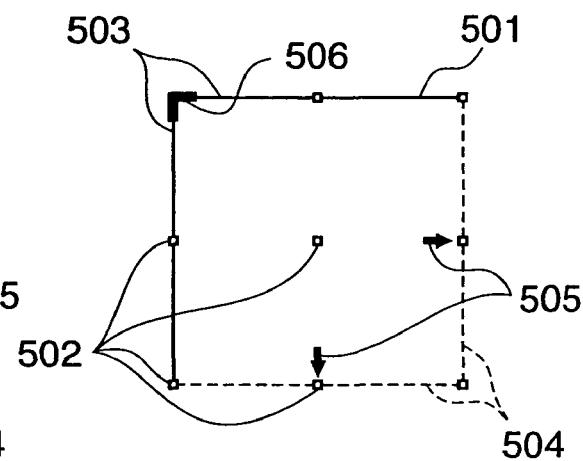
FIG. 5B is a view for explaining the container display rules according to the first embodiment of the present invention.

In FIG. 5B, both the width and height of the container 501 are flexible. An anchor icon 506 is so added as to explicitly represent that the corner position between two crossing edges 503 is fixed.

Figure 5C:
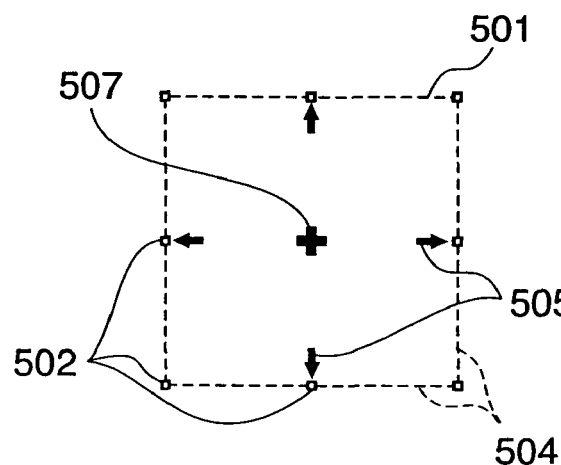
FIG. 5C is a view for explaining the container display rules according to the first embodiment of the present invention.

FIG. 5C shows a state in which both the width and height of the container 501 are flexible, and the container 501 can be equally enlarged in directions around the central point, as indicated by an arbitrary anchor icon 507. That is, the container 501 can be enlarged or reduced using the anchor icon 507 as a center. In enlargement/reduction, the layout is adjusted so that the position of the anchor icon 507 is always kept at the central point of the container 501.

Figure 5D:
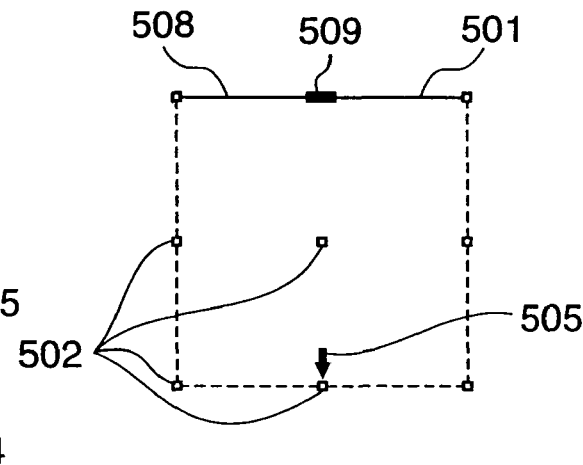
FIG. 5D is a view for explaining the container display rules according to the first embodiment of the present invention.

In FIG. 5D, an upper edge 508 of the container 501 is fixed, but both the width and height are flexible. The anchor icon 509 positioned at the center of the upper edge 508 is fixed. The left and right edges (502) of the container 501 pass the anchor icon 509 and move apart from or close to the vertical center axis (vertical axis).

[Link]

A link indicates association between containers. The association represents a distance between containers, and containers associated by a link execute layout calculation upon a change in their layouts. For example, the link 412 in FIG. 4 associates the containers 407 and 408 with each other, as described above. The link setting method and the layout calculation method for containers associated by a link will be described later.

[Link Setting Method]

Setting of a link for associating containers will be explained.

Figure 6:
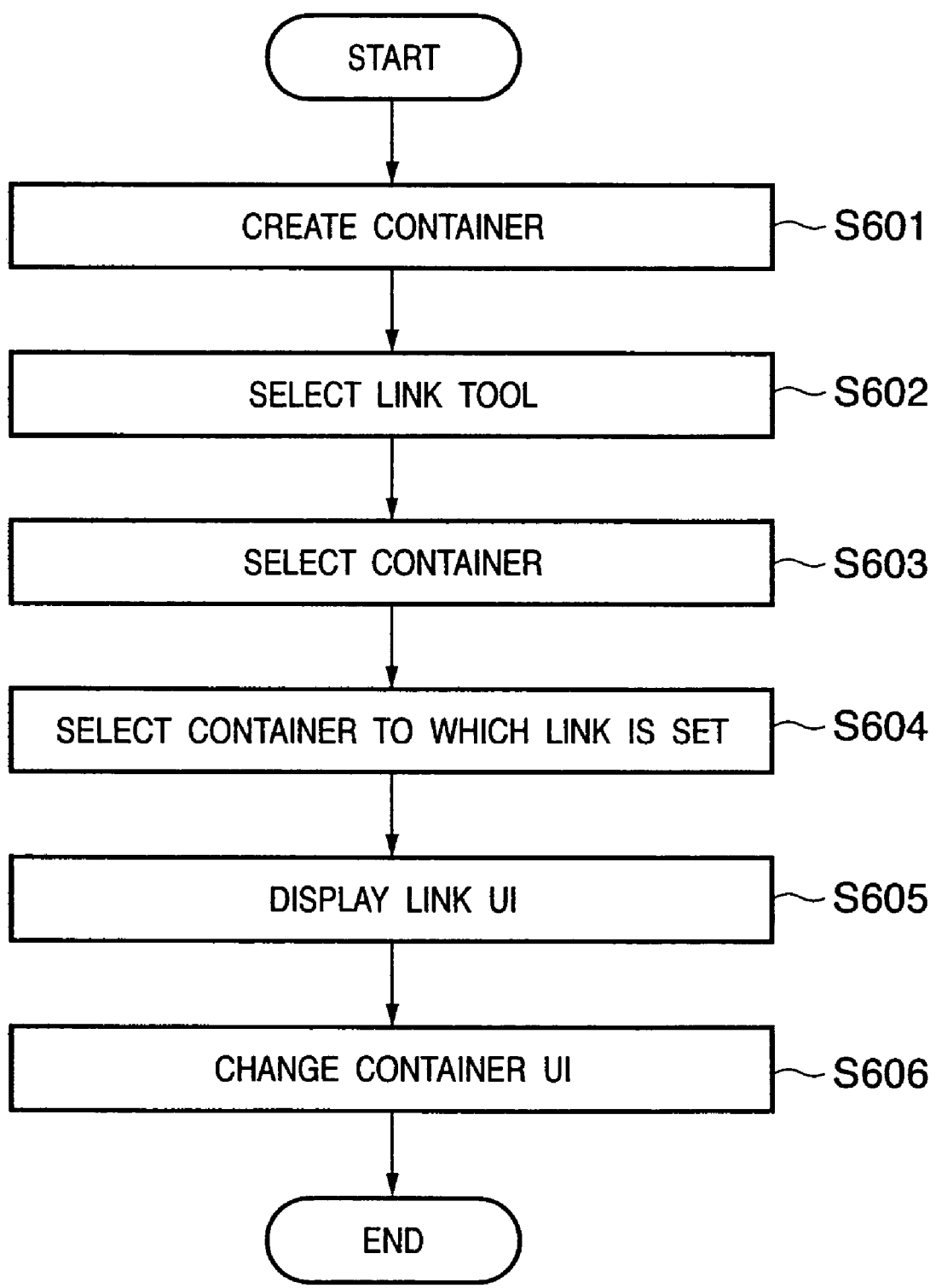
FIG. 6 is a flowchart showing a link setting process according to the first embodiment of the present invention.
Figure 7A:
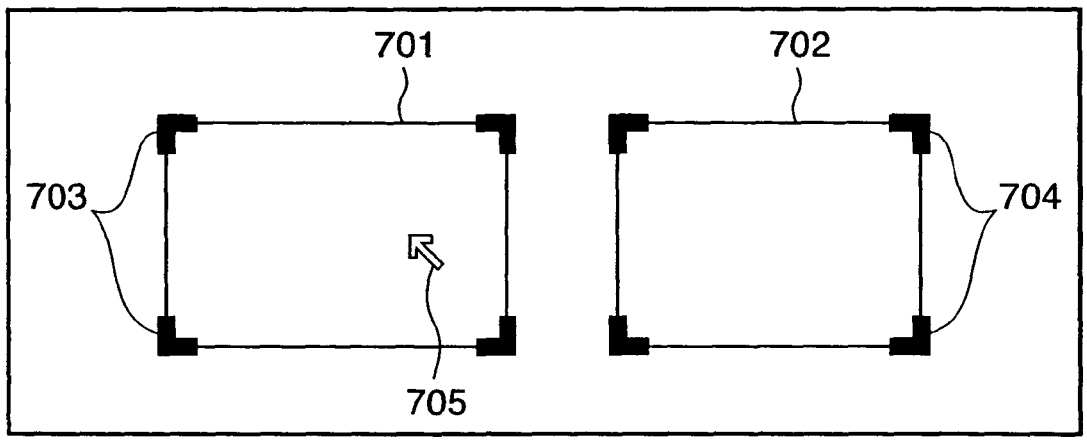
FIG. 7A is a view showing an example of transition of the user interface in setting a link according to the first embodiment of the present invention.
Figure 7B:
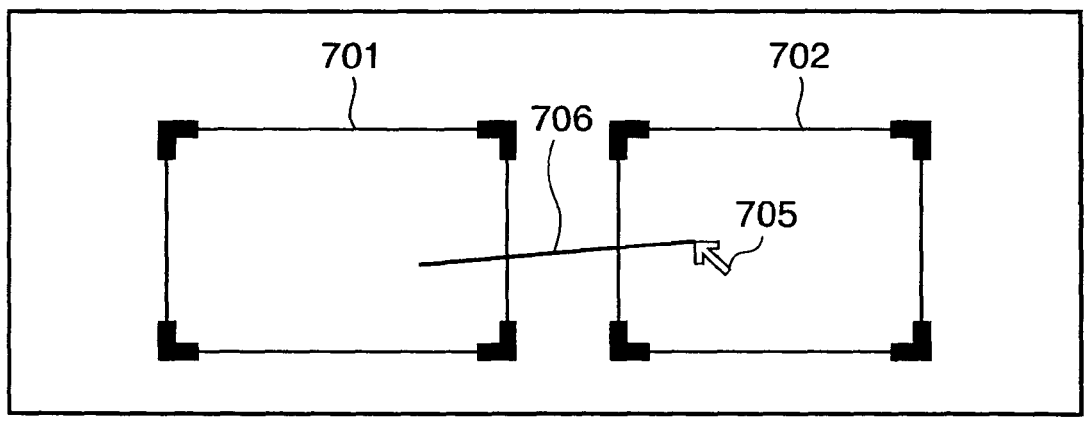
FIG. 7B is a view showing the example of transition of the user interface in setting a link according to the first embodiment of the present invention.
Figure 7C:
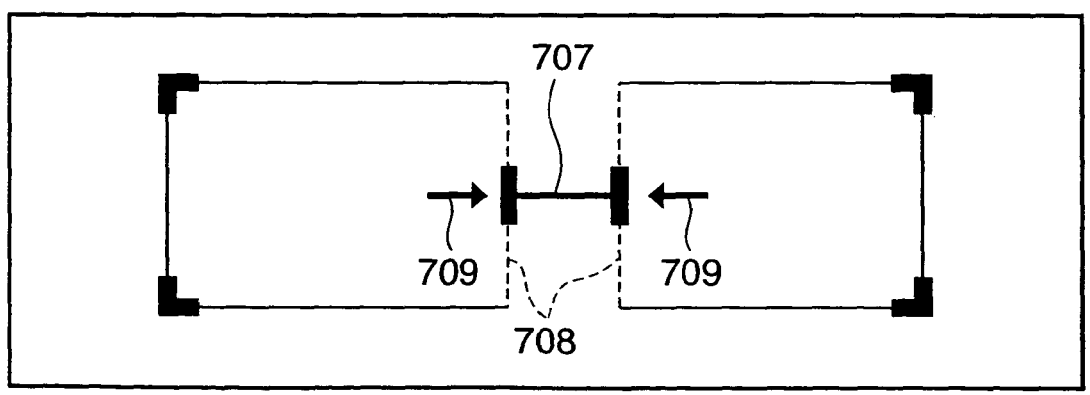
FIG. 7C is a view showing the example of transition of the user interface in setting a link according to the first embodiment of the present invention.

FIG. 6 is a flowchart showing a link setting process according to the first embodiment of the present invention. FIGS. 7A to 7C are views showing an example of transition of a user interface in setting a link according to the first embodiment of the present invention. The method of setting a link between containers will be explained with reference to FIGS. 6 and 7A to 7C.

In step S601, the layout editing application 121 displays a document template selected as an editing target in the work area 306 of the user interface. In order to set a link, (at least two) containers to which a link is to be set must be created on the document template. FIGS. 7A to 7C show an example of transition of the user interface when two containers are created and a link is set in step S601.

In step S602, the layout editing application 121 selects a link tool (the link tool is selected by clicking the button 406 in FIG. 4).

In FIG. 7A, containers 701 and 702 are made up of fixed edges. Reference numerals 703 and 704 denote anchors, similar to 409 in FIG. 4. Reference numeral 705 denotes a mouse pointer.

While the link tool is selected, the user clicks on and selects one (e.g., the container 701) of two containers to which a link is to be set. In accordance with this operation, the user interface 103 of the layout editing application 121 recognizes that the first container has been selected (step S603), and holds information which specifies the selected container.

A locus corresponding to subsequent movement of the mouse cursor is displayed on the screen. For example, a line segment 706 in FIG. 7 exhibits a line which connects a click position in the state of FIG. 7A and the current position of the mouse pointer 705. A UI indicated by the line segment 706 can present the user with a position at which a link is set.

As shown in FIG. 7B, the user moves the mouse pointer 705 to the other container (container 702) and clicks. In accordance with this operation, the user interface 103 recognizes that the second container has been selected (step S604), and holds information which specifies the selected container.

The layout editing application 121 sets a link between the first container selected in step S603 and the second container selected in step S604.

After the link is set between the two containers 701 and 702 selected by the user, a link 707 is displayed (step S605). In response to the link setting, the container display state changes to a state in FIG. 7C (step S606).

That is, the container UI is automatically changed upon setting the link. In this case, edges associated by the link become flexible and are drawn in dotted lines. In FIG. 7C, reference numeral 708 denotes an edge which is drawn in a dotted line and is a flexible edge, as described above.

The state of the container edge as shown in FIG. 7C is automatically changed when the need for making the container edge flexible arises upon setting a link. A purpose of this operation is to prevent a contradictory state in which all edges are fixed though a link is set. Reference numeral 709 denotes a mark which, similar to 505 in FIG. 5, visually presents the user with a direction in which a container can be changed upon setting a link. In the example of FIG. 7C, the right edge of the left container and the left edge of the right container change to a flexible state, but this is merely an example. The right container may change to a setting having the slider 413 in FIG. 4.

<Layout Calculation Process by Layout Engine>
[Layout Calculation Method (Overall Flow)]

The layout editing application 121 according to the first embodiment has at least two modes. One is a layout mode in which containers are created using the user interface 103 and associated (link is set) to create a layout. The other is a preview mode in which each record in the data source is inserted into a created layout by the layout engine 105 and a layout result to which the record is actually inserted is previewed.

In the preview mode, an actual record is inserted, and the layout is calculated. In the preview mode, layout calculation on the display is performed. In actual printing, the layout engine 105 inserts data into each container and calculates the layout, and the calculation method at this time is the same as that in the preview mode.

FIG. 8 is a flowchart showing the layout calculation process according to the first embodiment of the present invention.

The preview mode is selected (step S801). In the preview mode, the layout editing application 121 prompts the user to select a record to be previewed from the data source, and inserts each field data of the selected record into each container (step S802).

After the field data is inserted into each container, the layout editing application 121 executes layout calculation for laying out the record, and if necessary, adjusts the layout (step S803). Details of layout calculation in step S803 will be described later.

The layout editing application 121 displays (previews) the layout calculated in step S803 (step S804). The layout editing application 121 determines on the basis of an instruction from the user whether to preview another record (step S805). If another record need not be previewed in step S805 (NO in step S805), the preview mode ends (step S807).

If another record needs to be previewed (YES in step S805), the layout editing application 121 selects another record, executes layout calculation again, and previews the calculated layout (step S806).

In printing, unlike the preview mode, layout calculation is sequentially performed for all records to be printed. In print-ing, therefore, step S804 is omitted, and whether all records to be printed have been processed is determined in step S805. In step S803, the results of layout calculation are drawn, output, and generated as print data using the printer driver, thereby outputting the print data to the printer. In this case, the process ends when print data are output for all records (all records to be printed).

[Layout Calculation Method (Details)]

Details of layout calculation in step S803 will be explained with reference to FIG. 9.

Figure 9:
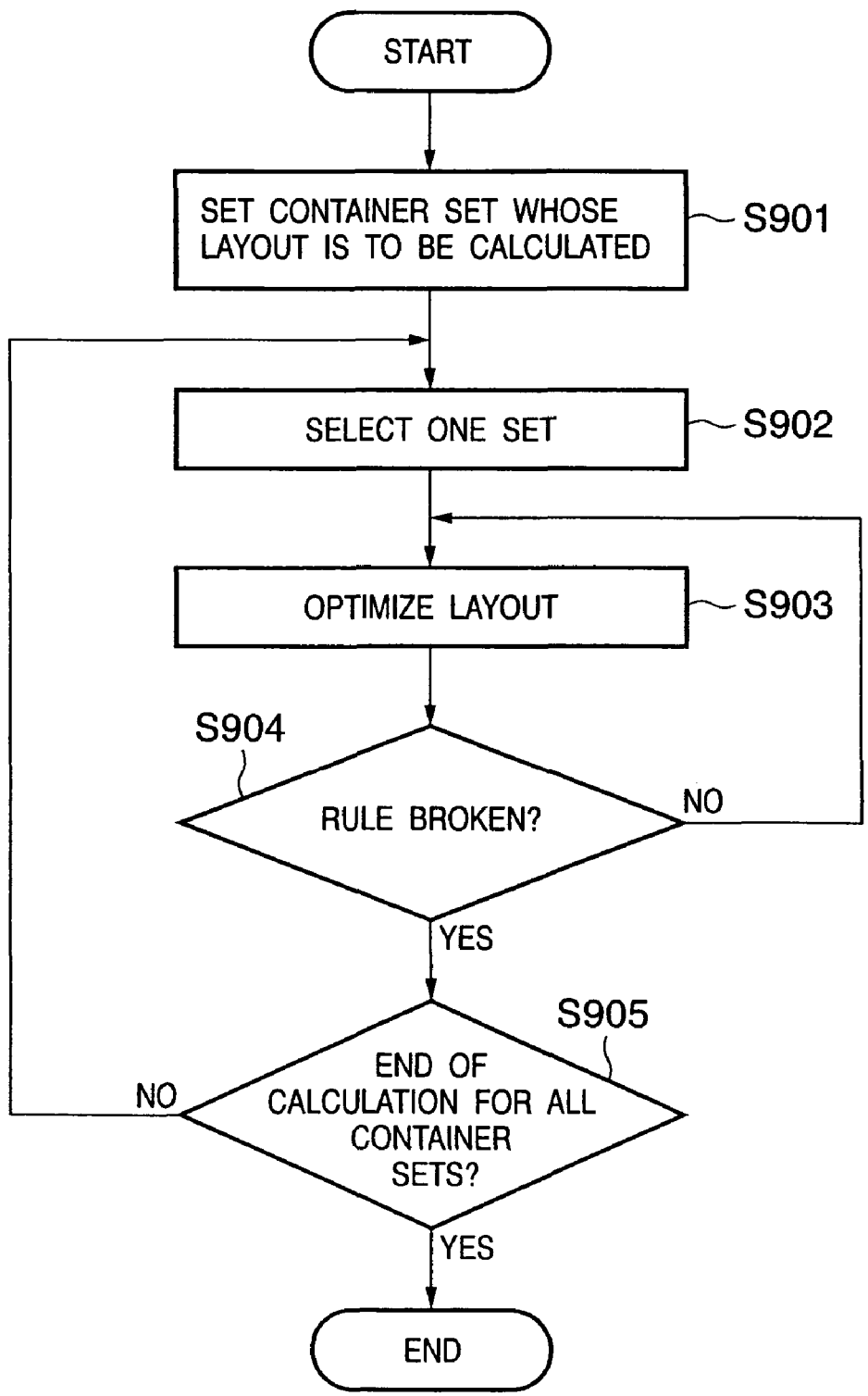
FIG. 9 is a flowchart showing details of the layout calculation process according to the first embodiment of the present invention.

FIG. 9 is a flowchart showing details of the layout calculation process according to the first embodiment of the present invention.

FIG. 9 is a flowchart for explaining only the layout calculation process, and this flow corresponds to a layout calculation process in printing/previewing of one record in variable data printing. For a plurality of records, the following process is repeated.

The layout editing application 121 sets a set of containers whose layout is to be calculated (step S901). Layout calculation is done for associated containers as one set.

Figure 10:
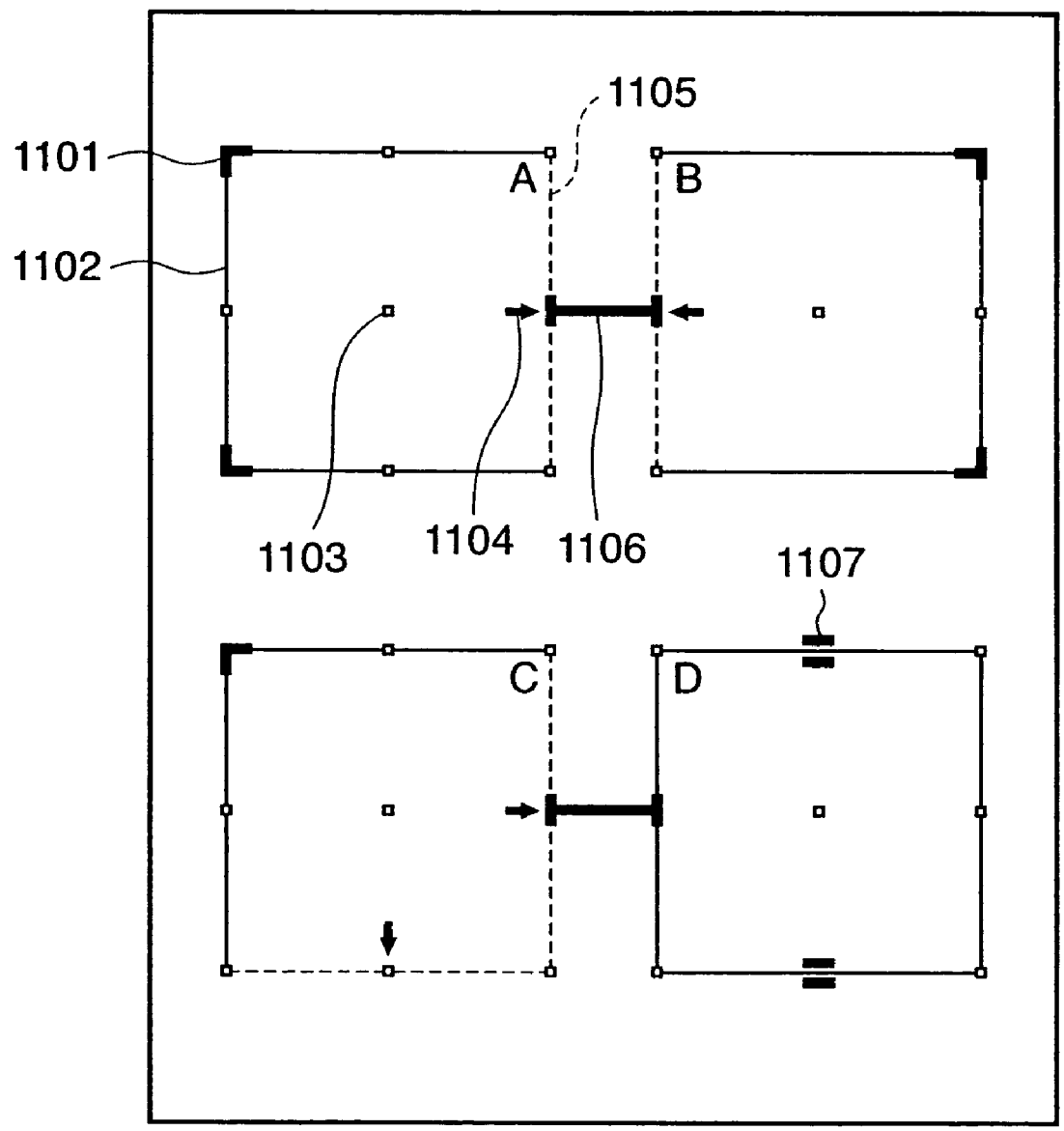
FIG. 10 is a view for explaining a set of containers in the layout calculation process according to the first embodiment of the present invention.

For example, referring to FIG. 10, four containers are laid out on a page, and association is set between the containers. In this case, containers A and B are associated by a link, whereas containers C and D are associated by a link.

Containers A and B are specified as set 1, whereas containers C and D are specified as set 2. In other words, containers connected by a link are specified as one set. As described above, reference numeral 1101 denotes an anchor; 1102, a fixed edge; 1103, a controller; 1104, an arrow indicating a direction in which a flexible edge changes; 1105, a flexible edge; 1106, a link; and 1107, a slider.

The layout editing application 121 selects one of the container sets obtained in step S901 in order to calculate a layout (step S902). The layout is calculated for the selected container set.

For two containers A and B as flexible elements contained in the selected container set, a size when each container is free from any constraint is calculated from the image size or text amount of data to be flowed.

More specifically, the layout editing application 121 determines whether container A is an image data container or text container. This determination is made on the basis of an attribute set for the container, as described above.

Then, the layout editing application 121 loads data flowed into container A. When container A is an image data container, the size (the numbers of pixels corresponding to the width and height, and resolution) of the image data is a size when container A is free from any constraint.

When container A is a text container, the amount of text data to be flowed into container A can be calculated on the basis of the number of characters and character attributes (e.g., the font type, font size, character pitch, and line pitch) designated by the container attributes of container A.

For a text container, constraints are imposed because the aspect ratio of container A cannot be decided unless constraints are taken into consideration. In the example of FIG. 10, anchors are set at the upper and lower left corners of container A, and its height (longitudinal direction) is fixed. The layout editing application 121 determines whether characters of a calculated data amount (text amount) can be flowed into container A having a width (lateral direction) set as the basic pattern of container A.

If the layout editing application 121 determines that all characters can be flowed, the size (width and height) of container A that are set by the basic pattern is not changed. If the layout editing application 121 determines that all characters cannot be flowed, container A extends in the lateral direction because the height is fixed by anchor setting. The layout editing application 121 calculates the width of container A at which characters of the calculated data amount can be flowed, and thereby calculates the size of container A.

The layout editing application 121 optimizes the layout so as to minimize the difference between the size of the laid-out container and that of actual contents (step S903).

The layout is optimized so that the difference between the layout size and the size of contents to be inserted into a container is minimized in each of containers which are so associated as to dynamically change their sizes.

The layout editing application 121 calculates the size of the container set that is calculated in step S902, i.e., the total size of containers A and B and link 1106 (in this case, fixed link). The layout editing application 121 calculates the difference between the total size and the size (in the example of FIG. 10, corresponding to the distances of the anchor icons of containers A and B) of the container set in the basic layout. If containers A and B become wider, a difference value is generated after calculation in the previous step. The layout editing application 121 adjusts the layout by equally distributing the difference value to respective elements of the container set.

The layout editing application 121 optimizes the layout, and determines whether the layout breaks the rules (step S904). If the layout does not break rules (YES in step S904), the process advances to step S905. If the layout breaks the rules (NO in step S904), the process returns to step S903 to calculate the layout again so as not to break the rules.

The rules are constraints set by the user in creating a layout, and include constraints on the flexible range of the size of a container, and the position of the container, and for a flexible link, a constraint on a change of the length of the link. After the layout editing application 121 calculates the layout so as not to break the rules, the layout of the set is completed.

The process from steps S902 to S904 is performed for all sets on the page, and the layout editing application 121 determines whether the layout of the entire page has been calculated (step S905). If the calculation has not ended (NO in step S905), the process returns to step S902. If the calculation has ended (YES in step S905), the process ends.

An example of a UI in the above-described layout calculation will be explained with reference to FIGS. 11A to 11C.

Figure 11A:
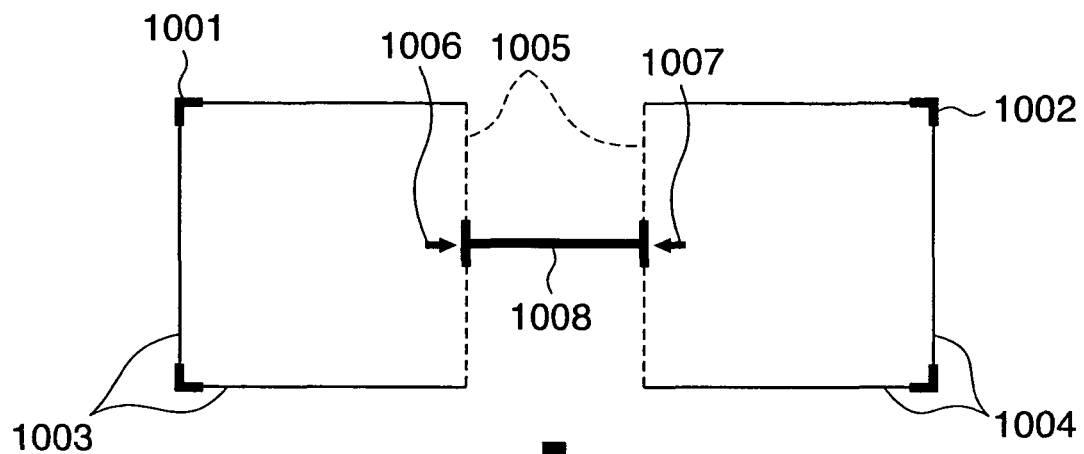
FIG. 11A is a view showing an example of the user interface in the layout calculation process according to the first embodiment of the present invention.
Figure 11B:
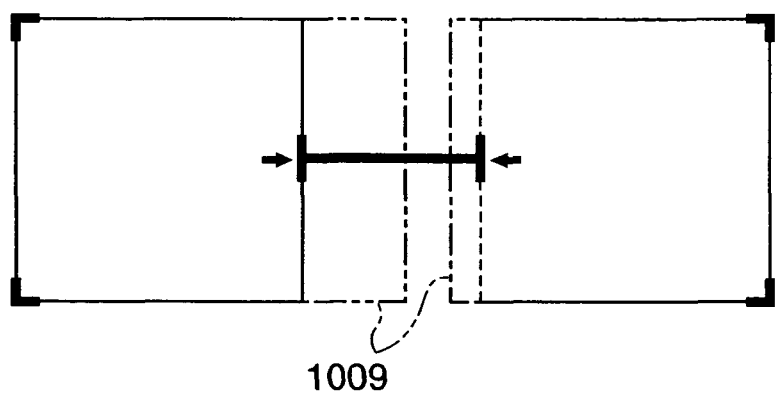
FIG. 11B is a view showing the example of the user interface in the layout calculation process according to the first embodiment of the present invention.
Figure 11C:
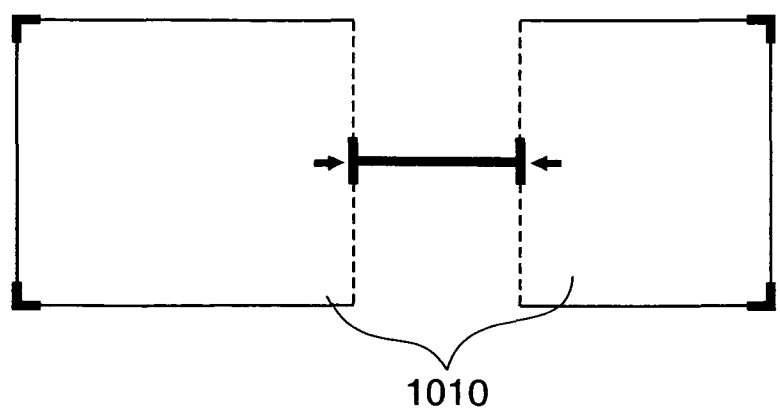
FIG. 11C is a view showing the example of the user interface in the layout calculation process according to the first embodiment of the present invention.

FIGS. 11A to 11C are views showing an example of a user interface in the layout calculation process according to the first embodiment of the present invention.

FIG. 11A shows a state in which a given record is inserted and the layout is decided. Reference numerals 1001 and 1002 denote anchors; 1003 and 1004, fixed edges; 1005, a flexible edge; 1006, an arrow indicating a direction in which a flexible edge changes; and 1108, a link. In this state, a record is changed, and contents of different sizes are inserted.

FIG. 11B shows the size of new contents over the state of FIG. 11A. Reference numeral 1009 denotes a size of contents which are inserted into each container. After that, the layout is calculated.

FIG. 11C shows the result of layout calculation. The size of each container after calculation is so calculated as to have a difference equal to that of the size of contents to be actually inserted, and not to break the above-mentioned rules. As shown in FIG. 11C, the inserted-content size 1009 shown in FIG. 11B and a calculated content size 1010 have the same difference.

[Setting of Flexible Link]

Figure 12:
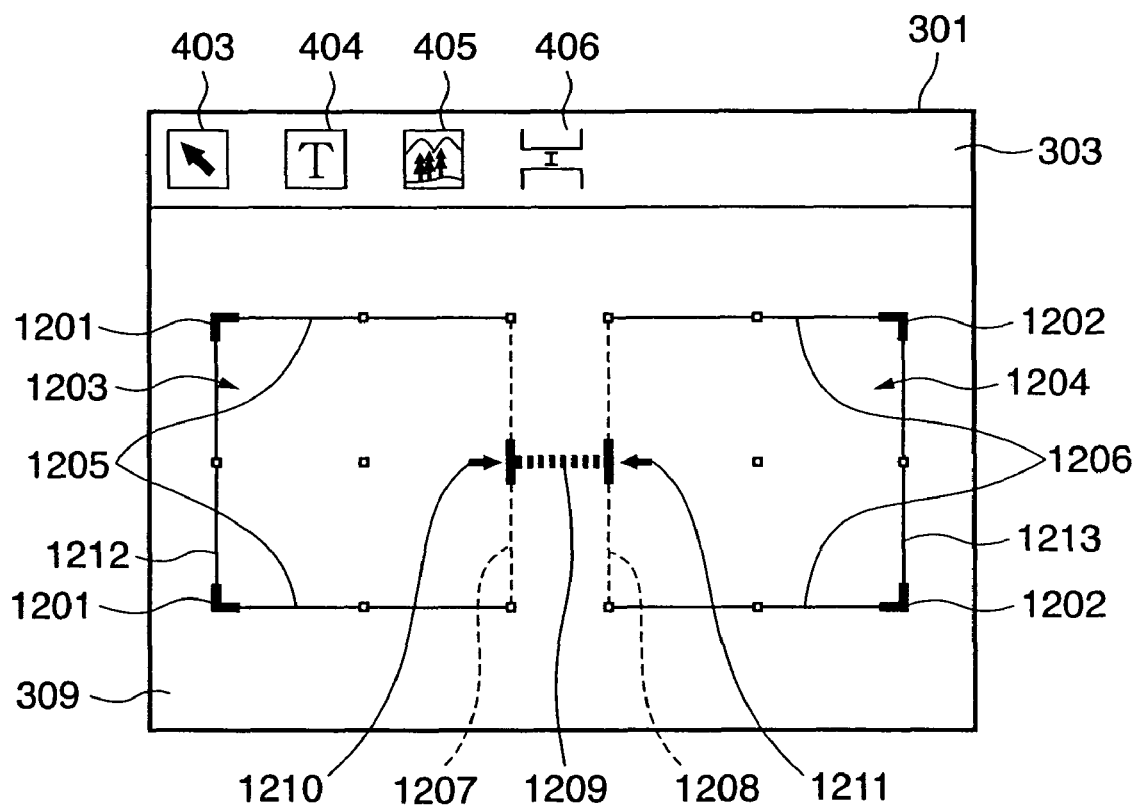
FIG. 12 is a view showing an example of a user interface for setting a flexible link according to the first embodiment of the present invention.

FIG. 12 is a view showing an example of a user interface for setting a flexible link according to the first embodiment of the present invention.

In FIG. 12, similar to FIG. 4, the application window 301 and tool bar 303 are provided. In the state of FIG. 12, containers 1203 and 1204 exist on the document template 309. These containers include anchor icons 1201 and 1202, and fixed edges 1205 and 1206, respectively.

A link 1209 of a flexible size is set between the containers 1203 and 1204, and links them. Since the link 1209 is set between the containers 1203 and 1204, a right edge 1207 of the container 1203 and a left edge 1208 of the container 1204 are represented in dotted lines. Indicators 1210 and 1211 are displayed on the respective containers to exhibit that the edges 1207 and 1208 are flexible.

Figure 13:
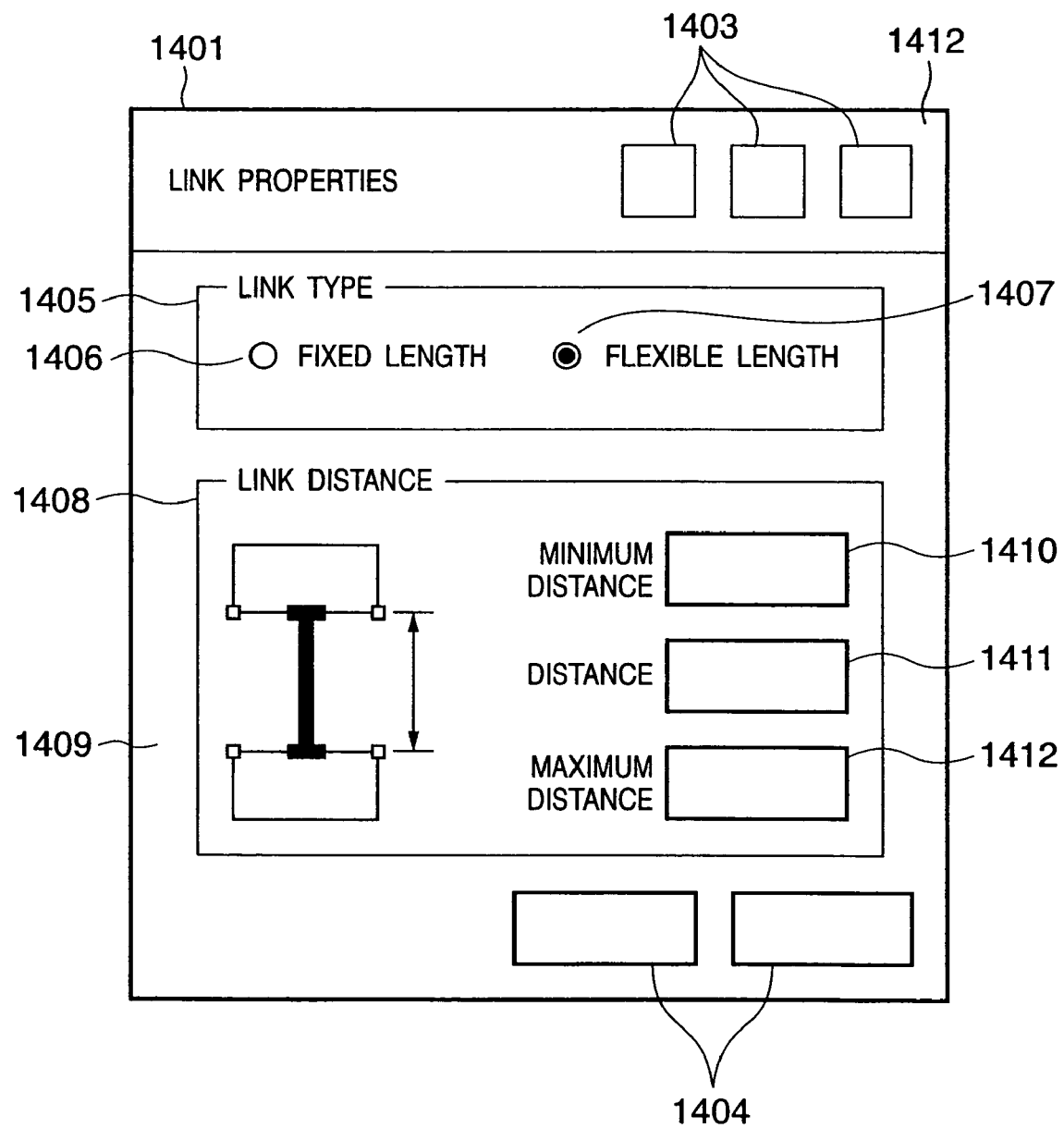
FIG. 13 is a view showing an example of a user interface which implements a link setting function according to the first embodiment of the present invention.

FIG. 13 is a view showing an example of a user interface which implements a link setting function according to the first embodiment of the present invention.

FIG. 13 illustrates an example of a dialog window 1401 for setting information on the link 1209. The dialog window 1401 is made up of a title bar 1402, a tool button 1403, a button 1404 for opening/closing the dialog window 1401, and an area 1409 for setting various pieces of information.

The dialog window 1401 provides a link-type field 1405 having radio buttons for alternatively selecting whether the link type is a link of a flexible length (1407) or a link of a fixed length (1406).

When the link type exhibits a flexible length, a link distance field 1408 is highlighted which is made up of a minimum value field 1410 (minimum distance) for the link length, a maximum value field 1412 (maximum distance), and a reference value field (distance).

The dialog window 1401 in FIG. 13 is displayed when, for example, a link is set between two containers by link setting operation described with reference to FIGS. 6 and 7A to 7C, and the set link is then selected by operation such as clicking. Alternatively, the dialog window 1401 associated with a link may be automatically displayed immediately after the link is set. A reference value 1411 of the distance between containers is a link length used when the size of each container is not changed upon flowing data.

A flexible link setting method will be explained with reference to FIG. 14.

Figure 14:
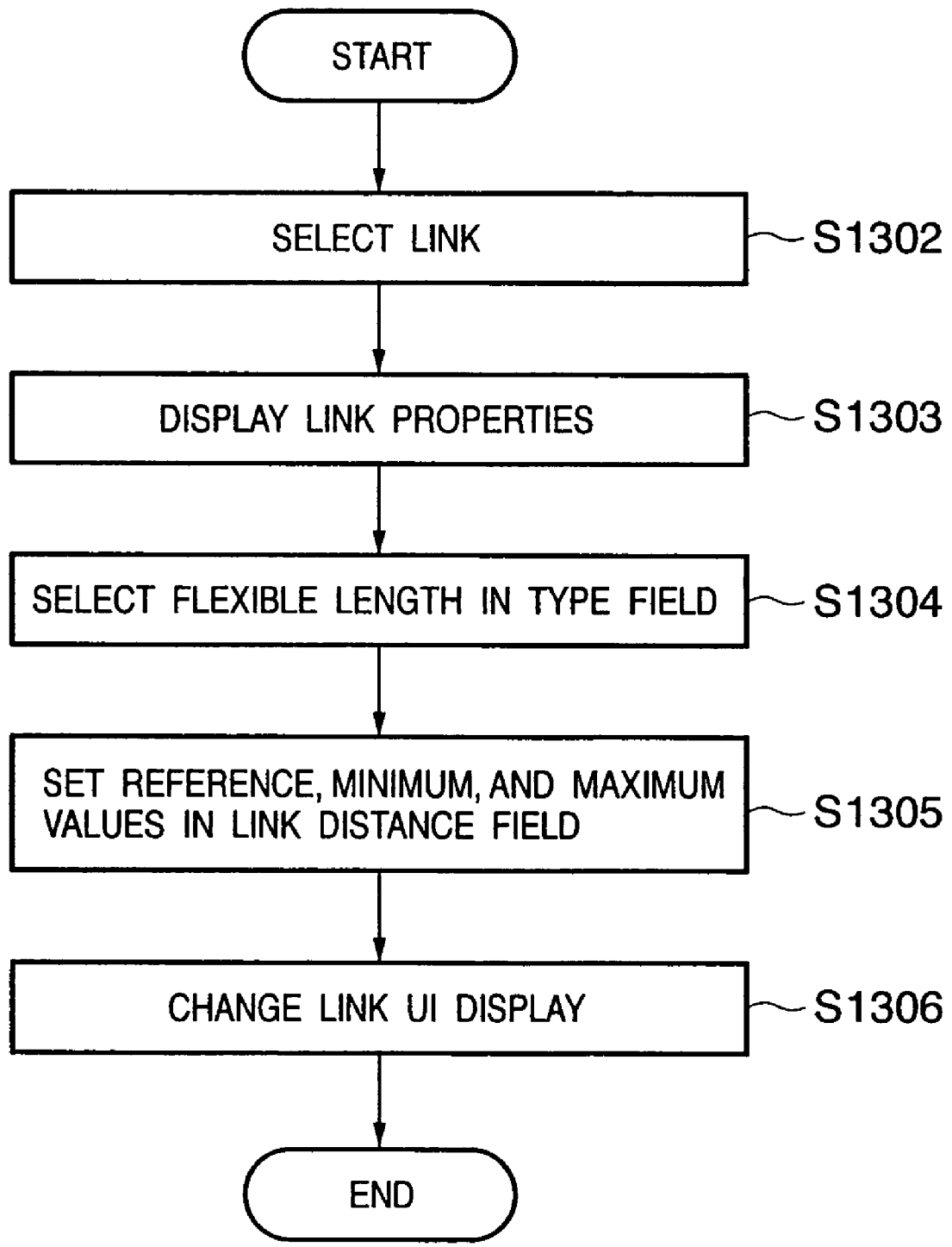
FIG. 14 is a flowchart showing a flexible link setting process according to the first embodiment of the present invention.

FIG. 14 is a flowchart showing a flexible link setting process according to the first embodiment of the present invention.

For example, when a link is set between two containers A and B in FIG. 10 by link setting operation described with reference to FIGS. 6 and 7A to 7C, a link of a fixed size is set. By selecting the link and executing a process shown in FIG. 14, the link can be changed from the link 1106 (FIG. 10) of the fixed size to the link 1209 (FIG. 12) of the flexible size.

A desired link (e.g., the link 1106 in FIG. 10) is selected with the mouse 133 (step S1302). After predetermined operation for displaying link properties is done, the user interface 103 of the layout editing application 121 displays the dialog window 1401 (FIG. 13) corresponding to the selected link (to be referred to as a target link hereinafter) (step S1303).

Link selection operation may be any operation such as right clicking of the mouse 133 or operation of a specific key of the keyboard 132, similar to setting of the basic pattern of a container.

The displayed dialog window 1401 shows the current state of the selected link. Since the link 1106 is selected in this example, the link size is fixed at this state, and the distance 1406 representing a fixed length is selected in the link-type field 1405.

In order to change the link from the fixed size to a flexible size in the dialog window 1401, the flexible length button 1407 for setting a flexible link size is selected in the link-type field 1405 (step S1304).

Accordingly, the maximum distance field 1412, minimum distance field 1410, and reference value field 1411 which are arranged in the link distance field 1408 become effective, allowing setting of numerical values. In order to set a flexible size of the link, the user sets the maximum value of the link length in the maximum distance field 1412, the minimum value in the minimum distance field 1410, and the current value in the reference value field 1411 (step S1305).

After setting, the user instructs the layout editing application 121 to apply these settings with the general dialog window open/close button 1404. When the user interface 103 detects this instruction, the user interface 103 reflects the setting state on the target link. Consequently, the link UI display is changed to a state as indicated by the link 1209 in FIG. 12 (step S1306).

Setting information of the dialog window 1401 is stored in, e.g., the memory 136.

An example of a layout result will be described with reference to FIGS. 15 and 16.

Figure 15:
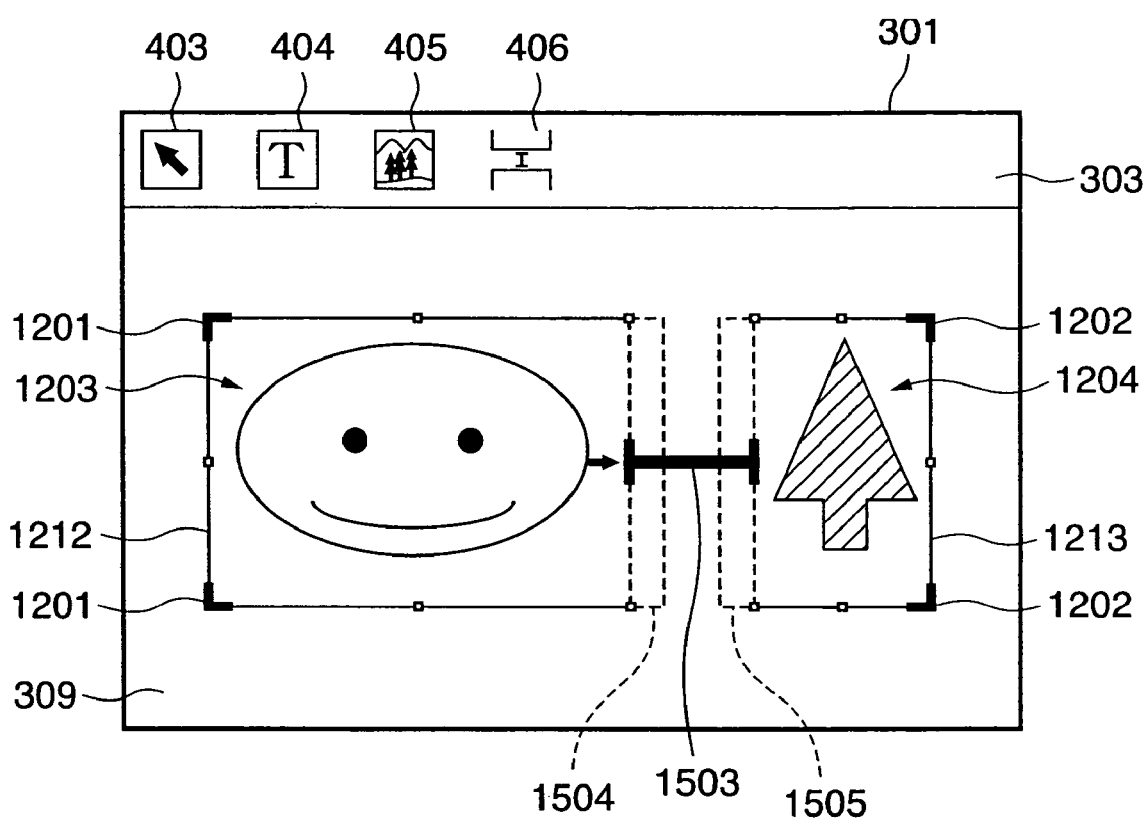
FIG. 15 is a view showing a layout result when a link of a fixed size is used according to the first embodiment of the present invention.

FIG. 15 is a view showing a layout result when a link of a fixed size is used according to the first embodiment of the present invention.

The layout calculation method is executed in the above-described way. For example, assume that image data of different sizes are inserted into the containers 1203 and 1204 in FIG. 15. In this case, each container regards the data size to be optimal. The container 1203 tries to change its size to the right so as to move close to a frame 1504 (optimal container size) which corresponds to the size of the inserted image. Similarly, the container 1204 tries to change its size to the left so as to move close to a frame 1505 (optimal container size) which corresponds to the size of the inserted image.

Since the containers 1203 and 1204 cannot move a left edge 1212 and right edge 1213 owing to the anchors 1201 and 1202, respectively, the interval between the containers 1203 and 1204 must be narrowed to change the size. However, a link 1503 of a fixed size is set between the containers 1203 and 1204, the length of the link 1503 is maintained in layout calculation, and thus the sizes of the containers 1203 and 1204 are changed.

As a result, the containers 1203 and 1204 cannot ensure optimal sizes corresponding to the aspect ratio of data, and finally become smaller than the optimal sizes (frames 1504 and 1505), as shown in FIG. 15. Since the size of the link 1503 is fixed, the containers 1203 and 1204 cannot achieve their optimal sizes (in FIG. 15, a range indicated by a chain line in each container represents the aspect ratio of data).

Figure 16:
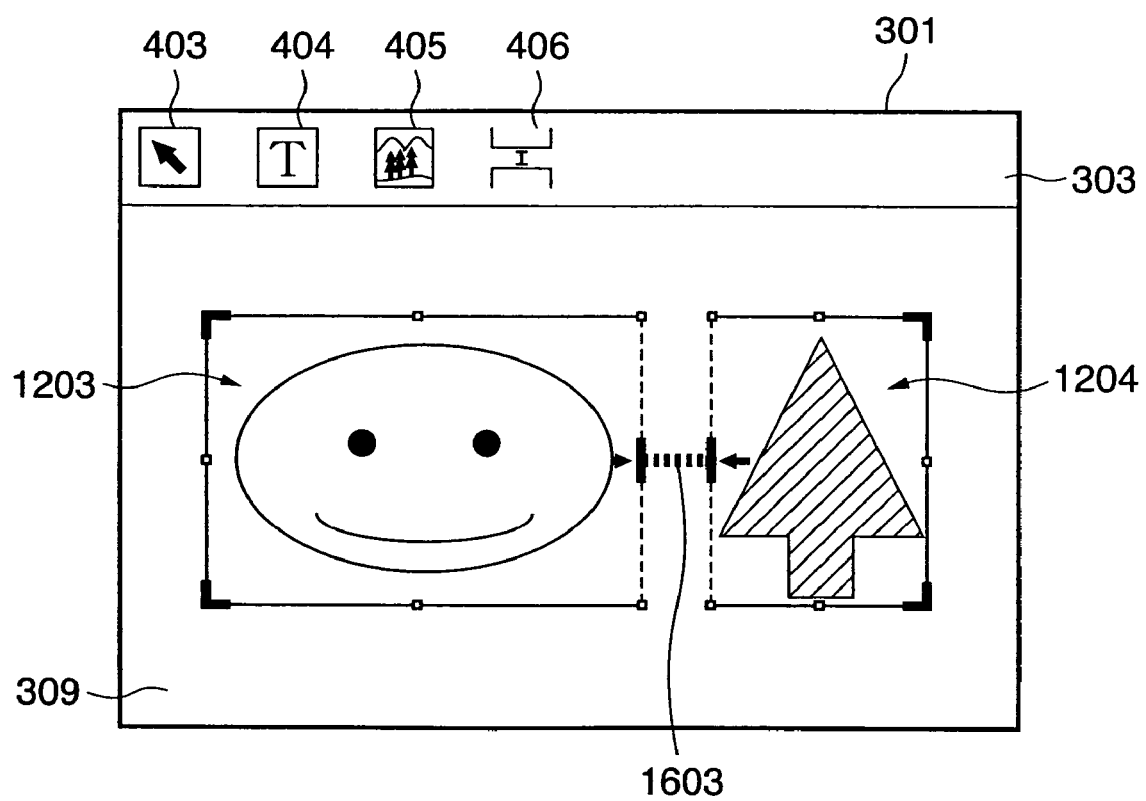
FIG. 16 is a view showing a layout result when a link of a flexible size is used according to the first embodiment of the present invention.

FIG. 16 shows a case wherein the link has a flexible size in the same state as that in FIG. 15.

In this case, a link 1603 of a flexible size is set between the containers 1203 and 1204 in the above example, as shown in FIG. 16. When the sizes of the containers 1203 and 1204 are changed, the link size decreases to make the sizes of the containers 1203 and 1204 larger than those in the example of FIG. 15.

Hence, an optimal size corresponding to the size of data to be inserted can be achieved, or a container frame more close to the size (optimal size) of data to be inserted can be set. FIG. 16 shows this result, and the flexible link 1209 in FIG. 12 has a size state as given by the flexible link 1603 as a result of layout calculation. In this case, the containers 1203 and 1204 change to optimal sizes (sizes complying with their data sizes), respectively.

The basic configuration as a premise of the present invention has been described.

The automatic layout system which is a feature of the present invention and can switch a document template will be explained in detail.

A layout calculation process of laying out containers by switching between a plurality of types of document templates will be described with reference to FIG. 17.

Figure 17:
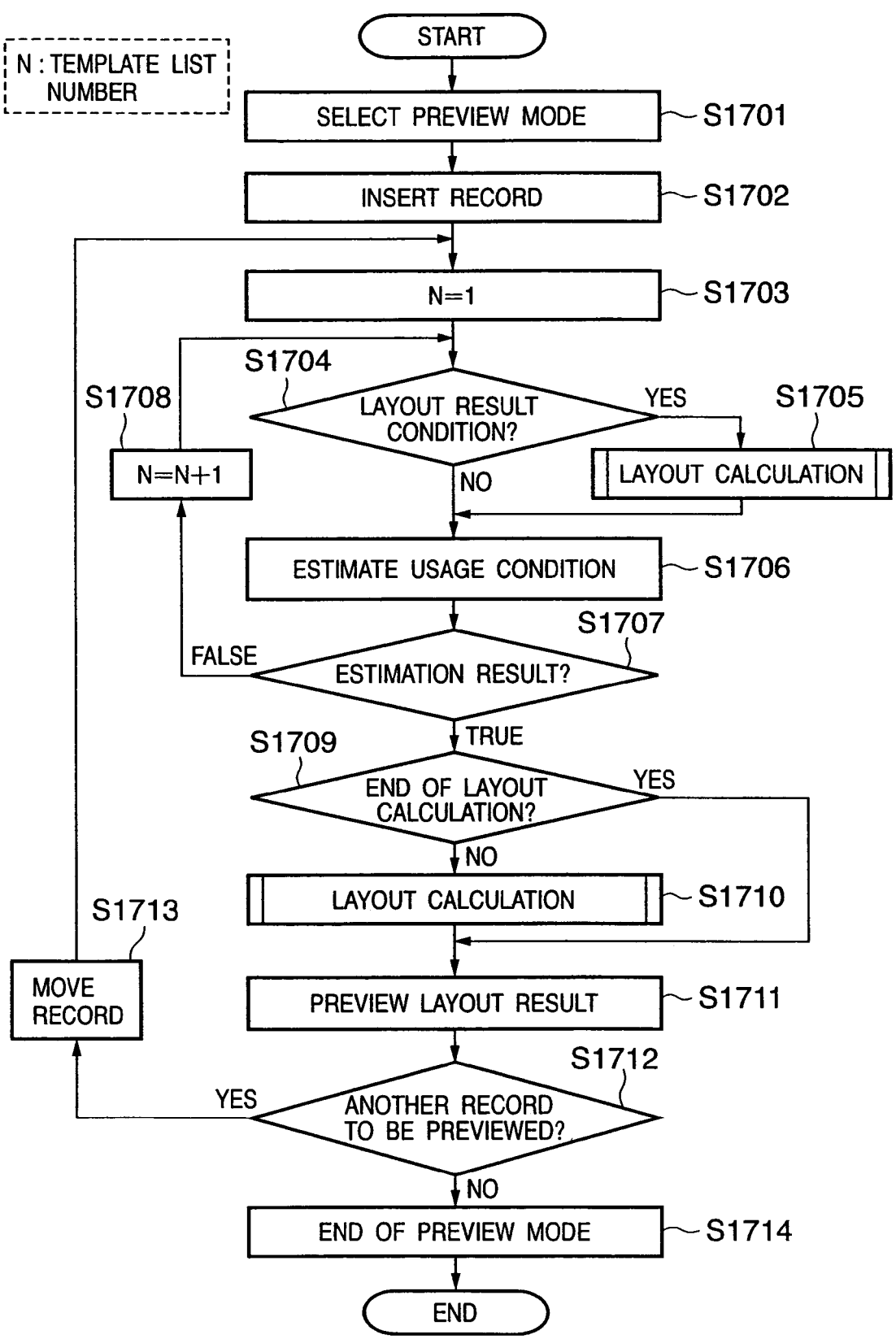
FIG. 17 is a flowchart showing a document layout calculation process in a configuration capable of switching between a plurality of types of document templates according to the first embodiment of the present invention.

FIG. 17 is a flowchart showing a document layout calculation process in the configuration capable of switching between a plurality of types of document templates according to the first embodiment of the present invention.

In FIG. 17, new steps are added to the flowchart of FIG. 8. In particular, steps S1701, S1702, S1705 (or step S1710), and steps S1711 to S1713 in FIG. 17 correspond to steps S801, S802, S803, and S805 to S807 in the flowchart of FIG. 8, and details thereof will be omitted. The process in FIG. 17 is implemented by the layout editing application 121 which is controlled by the processor 135 in the host computer 101, similar to the process in FIG. 8.

In FIG. 17, after the process in steps S1701 and S1702, the layout editing application 121 selects one document template used for layout control of data in a page of a variable data document from a template list containing a plurality of types of document templates set in advance. The template list is a list having at least one pair of a document template for use and its usage condition, and is stored in an area of the memory 136 that can be used by the layout editing application 121.

Settings for the template list can be implemented by, e.g., the administrator using a dedicated setting window. At this time, the user can set the usage condition and priority of a template with the keyboard 132 or the like, and the set contents are stored in an area of the memory 136 that can be used by the layout editing application 121. An example of the setting window will be described with reference to FIG. 18.

Figure 18:
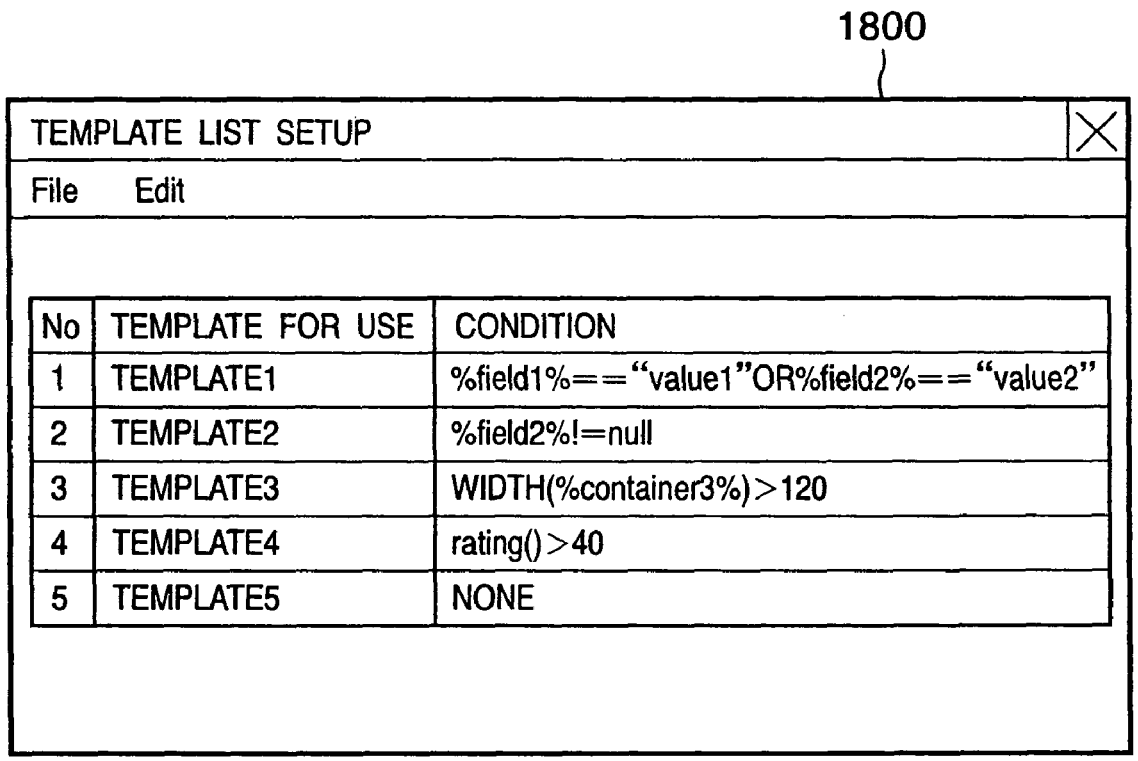
FIG. 18 is a view showing an example of a template list setting window according to the first embodiment of the present invention.

FIG. 18 is a view showing an example of the template list setting window according to the first embodiment of the present invention.

A setting window 1800 of FIG. 18 presents five document templates for use. As "No" representing a template list number is smaller, the assigned priority is higher. A list of the lowest priority represents a document template used when the usage conditions of document templates of other priorities are not satisfied. For this document template, no specific usage condition can be designated. By giving priorities to a plurality of types of document templates, a layout which further reflects the user's will can be created.

Examples of the usage conditions are a condition based on the data field value of a record, a condition based on the position/size of a laid-out container in which a record is adapted to a document template, and the "degree of deviation" of a laid-out page in which a record is adapted to the document template. That is, at least one of a usage condition based on a layout result and a usage condition not based on any layout result is set. The "degree of deviation" will be described later.

A plurality of usage conditions or a plurality of types of usage conditions can be combined and set for one template list. In FIG. 18, the usage condition of document template 1 at No. 1 is that document template 1 is used when the value of a data field "field 1" of a record is "value 1" or that of a data field "field 2" is "value 2".

The usage condition of document template 2 at No. 2 is that document template 2 is used when any value exists in a data field "field 2" of a record.

The usage condition of document template 3 at No. 3 is that document template 3 is used when the width of a laid-out container with a container name "container 3" in which a record is adapted to document template 3 is larger than "120". This usage condition is different from a usage condition for determining whether to use a document template, on the basis of a data field value in a document template to be processed, unlike usage conditions for Nos. 1 and 2. That is, the usage condition is a usage condition for determining whether to use a document template, on the basis of a layout result when a document template to be processed is temporarily applied, i.e., a usage condition (layout result condition) which depends on a layout result.

The usage condition of document template 4 at No. 4 is that document template 4 is used when the "degree of deviation (rating ( ))" of a laid-out page in which document template 4 is applied to a record is smaller than "40". The usage condition at No. 4 is also a layout result condition, similar to No. 3.

When a record is adapted to a document template to lay out the entire page, each container which is defined by a given document template may be laid out with a layout result different in the reference position and size set in the document template. The difference between the position/size of each container (laid-out container) obtained by the layout result and the reference position/size of each container (pre-layout container) defined by an original document template is expressed as a numerical value, which is defined as "degree of deviation".

The "degree of deviation" represents the numerical value of the difference in the position/size of each container before and after layout control using the document template.

Figure 19:
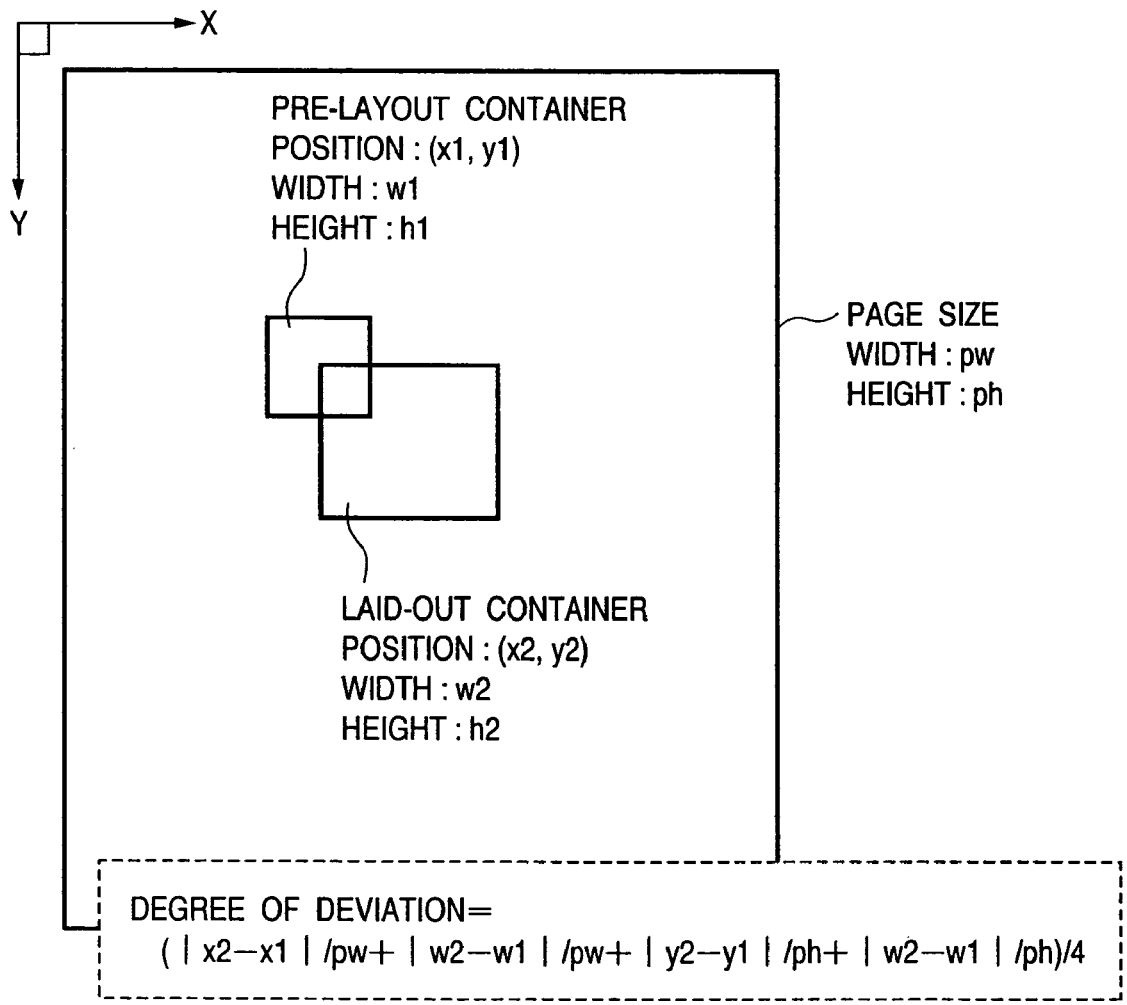
FIG. 19 is a view for explaining the degree of deviation according to the first embodiment of the present invention.

Various numerical methods are conceivable: for example, as shown in FIG. 19, the average value of the ratio of, to the page size, the differences in upper left point and size (width and height) between a laid-out container and a pre-layout container in the two, X-axis direction (horizontal direction) and Y-axis direction (vertical direction) defined for a page can be used. In this case, as the degree of deviation is smaller, the position/size of a laid-out container is closer to a reference position/size set in the document template.

The degree of deviation is calculated for each container included in a page, and the average value of the degrees of deviation of all containers included in the page is calculated, obtaining the degree of deviation of the page. In FIG. 19, assume that the position and size of a pre-layout container are $(x1,y1)$ and (width $w1$, height $h1$), those of a laid-out container are $(x2,y2)$ and (width $w2$, height $h2$), and the page size is (width $pw$, height $ph$). The degree of deviation can be calculated by $$\text{Degree of deviation} = (|x2-x1|/pw + |w2-w1|/pw + |y2-y1|/ph + |w2-w1|/ph)/4$$

By adopting the degree of deviation as a usage condition, a large deviation (difference) of the layout can be prevented even when different content data is flowed for each customer, like variable printing.

In this manner, whether the usage condition is satisfied is estimated in an order from a document template for an item of higher priority in the template list. A document template which first satisfies the usage condition is finally decided as a document template for use.

This can provide a variable data document having a layout using a preferable document template which satisfies a usage condition intended by the user. By completing settings on the setting window, a template list is created using information obtained from the setting window, and stored in the memory 136.

Referring back to the description of FIG. 17, after a record is inserted, the layout editing application 121 initializes the template list number N to be estimated to a value of the highest priority. In this case, N=1 is set (step S1703). By referring the template list in the memory 136, the layout editing application 121 determines whether the usage condition corresponding to the template list number N contains a layout result condition (step S1704).

In the example of FIG. 18, as described above, Nos. 1, 2, and 5 are usage conditions (usage conditions not based on any layout result) each containing no layout result condition, and Nos. 3 and 4 are usage conditions (usage conditions based on a layout result) each containing a layout result condition.

If the usage condition does not contain any layout result condition in step S1704 (NO in step S1704), i.e., the usage condition is based on only the data field value of the record, the layout editing application 121 estimates the usage condition (step S1706). If the usage condition contains a layout result condition (YES in step S1704), the layout editing application 121 applies the document template of the template list number N that is to be processed, performs layout calculation, and if necessary, adjusts the layout (step S1705).

The layout editing application 121 estimates the usage condition by using the obtained layout result (step S1706). Then, the layout editing application 121 determines the estimation result of the usage condition (step S1707). If the estimation result is "FALSE", i.e., the usage condition is not satisfied, the layout editing application 121 increments the template list number N by one in order to change the estimation target to the next usage condition (step S1708), and then the process returns to step S1704. The process in steps S1704 to S1707 is repeated until the estimation result becomes "TRUE".

By repeating this process, a template is selected on the basis of the priority set in advance by the user, and whether the usage condition is satisfied can be determined (estimated) using content data.

An unconditional usage condition (usage condition of the lowest priority) under which the estimation is always "TRUE", in other words, an unconditional usage condition which does not require any estimation is set at the end of the template list. The estimation result, therefore, always becomes "TRUE" at last, and the process can be prevented from entering an infinite loop. By the above process, a document template for a usage condition when the estimation result becomes "TRUE" is finally defined as a document template for use.

The layout editing application 121 determines whether layout calculation based on the document template for use has been completed (step S1709). If layout calculation has been completed (YES in step S1710), the process advances to step S1711. If no layout calculation has been completed (NO in step S1709), the layout editing application 121 performs layout calculation based on the document template (step S1710). The case wherein layout calculation has not been completed is a case wherein a usage condition determined to be "TRUE" contains a layout result condition. Upon the completion of layout calculation, the process advances to step S1711.

The layout editing application 121 displays (previews) a layout result obtained by layout calculation in step S1705 or S1710 (step S1711). After that, the process in steps S1712 to S1714 is executed.

As has been described above, according to the first embodiment, the container position can be shifted, the container size can be changed (enlarged/reduced), in addition, the paper size can be switched, and a completely different layout can be used by automatically switching the document template to one which satisfies a preset usage condition. The usage condition can set priority for each template, and a usage condition based on a layout result (e.g., the position and size of a container after data is inserted). Switching of a document template which more properly meets a user's application purpose or intention at a higher degree of freedom can be implemented.

Second Embodiment

The first embodiment assumes that the template list is stored in the memory 136 in advance. The template list can also be created as a file which can be referred to by the layout editing application 121, or stored in a database.

As the storage form, the template list may be stored in a file independent of a document template, or a corresponding usage condition may be stored in each document template. With either storage form, the process in FIG. 17 can be executed by appropriately acquiring necessary information from a storage destination and expanding the information as a template list in the application work area of the memory 136.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

The present invention is not limited to the above embodiments and various changes and modifications can be made within the spirit and scope of the present invention. Therefore, to appraise the public of the scope of the present invention, the following claims are made.

CLAIM OF PRIORITY

This application claims priority from Japanese Patent Application No. 2004-231430 filed on Aug. 6, 2004, the entire contents of which are hereby incorporated by reference herein.

What is claimed is:

1. An information processing apparatus, having a processor and a memory, which executes layout processing of content data in a page on the basis of a template that defines a layout of text and image as the content data in the page, comprising:
  a selecting unit adapted to select a template from a plurality of types of templates in accordance with a priority order;
  a deciding unit adapted to decide a difference between (1) the size and the position of a region in the template after the content data is inserted and (2) the size and the position of the region in the template before the content data is inserted, when a usage condition of the template selected by said selecting unit requires the difference between before and after layout control using the template;
  a using unit adapted to use the template selected by said selecting unit when the difference decided by said deciding unit meets the usage condition of the template; and
  a changing unit adapted to change the template selected by said selecting unit to a template different from the template selected by said selecting unit in accordance with the priority order when the difference decided by said deciding unit does not meet the usage condition of the template.

2. The apparatus according to claim 1, further comprising a setting unit adapted to set a template to be registered in the template list, and the usage condition and priority for the template.

3. The apparatus according to claim 1, wherein a usage condition of a template of the lowest priority among the plurality of types of templates is an unconditional usage condition which does not require deciding by said deciding unit.

4. A method of controlling an information processing apparatus which executes layout processing of content data in a page on the basis of a template that defines a layout of text and image as the content data in the page, comprising:
- a selecting step of selecting a template from a plurality of types of templates in accordance with a priority order;
- a deciding step of deciding a difference between (1) the size and the position of a region in the template after the content data is inserted and (2) the size and the position of the region in the template before the content data is inserted, when a usage condition of the template selected in said selecting step requires the difference between before and after layout control using the template;
- a using step for using the template selected in said selecting step when the difference decided in said deciding step meets the usage condition of the template; and
- a changing step for changing the template selected in said selecting step to a template different from the template selected in said selecting step in accordance with the priority order when the difference decided in said deciding step does not meet the usage condition of the template.

5. The method according to claim 4, further comprising a setting step of setting a template to be registered in the template list, and the usage condition and priority for the template.

6. The method according to claim 4, wherein a usage condition of a template of the lowest priority among the plurality of types of templates is an unconditional usage condition which does not require deciding in said deciding step.

7. A non-transitory computer readable medium, having a program stored thereon for implementing control of an information processing apparatus which executes layout processing of content data in a page on the basis of a template that defines a layout of text and image as the content data in the page, the program comprising:
- a program code for a selecting step of selecting a template from a plurality of types of templates in accordance with a priority order;
- a program code for a deciding step of deciding a difference between (1) the size and the position of a region in the template after the content data is inserted and (2) the size and the position of the region in the template before the content data is inserted, when a usage condition of the template selected in said selecting step requires the difference between before and after layout control using the template;
- a program code for a using step for using the template selected in said selecting step when the difference decided in said deciding step meets the usage condition of the template; and
- a program code for a changing step for changing the template selected in said selecting step to a template different from the template selected in said selecting step in accordance with the priority order when the difference decided in said deciding step does not meet the usage condition of the template.

8. The non-transitory computer readable medium according to claim 7, further comprising a program code for a setting step of setting a template to be registered in the template list, and the usage condition and priority for the template.

9. The non-transitory computer readable medium according to claim 7, wherein a usage condition of a template of the lowest priority among the plurality of types of templates is an unconditional usage condition which does not require deciding in said deciding step.

* * * * *